(12) United States Patent
Miura

(10) Patent No.: US 12,300,044 B2
(45) Date of Patent: May 13, 2025

(54) MANAGEMENT SYSTEM FOR WORKING MACHINE

(71) Applicant: KUBOTA CORPORATION, Osaka (JP)

(72) Inventor: Keisuke Miura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 433 days.

(21) Appl. No.: 17/718,836

(22) Filed: Apr. 12, 2022

(65) Prior Publication Data

US 2022/0237957 A1   Jul. 28, 2022

Related U.S. Application Data

(60) Division of application No. 15/938,670, filed on Mar. 28, 2018, now Pat. No. 11,335,133, which is a
(Continued)

(30) Foreign Application Priority Data

Sep. 29, 2015 (JP) .................................. 2015-191622
Sep. 29, 2015 (JP) .................................. 2015-191623
Sep. 29, 2015 (JP) .................................. 2015-191624

(51) Int. Cl.
*G07C 5/02* (2006.01)
*B60K 31/00* (2006.01)
(Continued)

(52) U.S. Cl.
CPC ............ *G07C 5/02* (2013.01); *B60K 31/0058* (2013.01); *E02F 9/2054* (2013.01); *G01S 11/06* (2013.01);
(Continued)

(58) Field of Classification Search
CPC ... G07C 5/02; G07C 3/00; G07C 3/02; G07C 5/008; B60K 31/0058; E02F 9/2054;
(Continued)

(56) References Cited

U.S. PATENT DOCUMENTS 5,664,113 A   9/1997   Worger et al.
7,283,810 B1  10/2007  Arakawa et al.
(Continued)

FOREIGN PATENT DOCUMENTS

CA   2314307 A1 * 1/2002 ............. B60R 25/24
JP   8273015        10/1996
(Continued)

OTHER PUBLICATIONS

Official Communication issued in International Patent Application No. PCT/JP2016/078274, dated Dec. 27, 2016.

*Primary Examiner* — Donald J Wallace
(74) *Attorney, Agent, or Firm* — Greenblum & Bernstein, P.L.C.

(57) ABSTRACT

An operation system of a working machine mounted on the working machine, including a first control device to control the working machine, and a first command device to output a command to the first control device wirelessly, the command relating to control of the first control device. The first command device includes a first obtaining part to obtain an expiration date of the working machine from outside, a first time calculating part to obtain time, a third processing part to judge whether the time obtained by the first time calculating part meets the expiration date, and a sixth communication part to output a first command when the time meets the expiration date, the first command restricting control of the first control device, and to output a second command
(Continued)

when the time does not meet the expiration date, the second command allowing the first control device to be controlled without restriction.

16 Claims, 14 Drawing Sheets

Related U.S. Application Data continuation of application No. PCT/JP2016/078274, filed on Sep. 26, 2016.

(51) Int. Cl.
| | |
|---|---|
| *E02F 9/20* | (2006.01) |
| *G01S 11/06* | (2006.01) |
| *G07B 15/00* | (2011.01) |
| *G07C 3/00* | (2006.01) |
| *G07C 3/02* | (2006.01) |
| *G07C 5/00* | (2006.01) |
| *E02F 3/32* | (2006.01) |
| *E02F 3/96* | (2006.01) |
| *E02F 9/26* | (2006.01) |
| *G06Q 30/0645* | (2023.01) |

(52) U.S. Cl.
CPC ............... *G07B 15/00* (2013.01); *G07C 3/00* (2013.01); *G07C 3/02* (2013.01); *G07C 5/008* (2013.01); *E02F 3/325* (2013.01); *E02F 3/964* (2013.01); *E02F 9/2025* (2013.01); *E02F 9/2062* (2013.01); *E02F 9/26* (2013.01); *G06Q 30/0645* (2013.01)

(58) Field of Classification Search
CPC ......... E02F 3/325; E02F 3/964; E02F 9/2025; E02F 9/2062; E02F 9/26; G01S 11/06; G07B 15/00; G06Q 30/0645
See application file for complete search history.

(56) References Cited

U.S. PATENT DOCUMENTS

| | | | |
|---|---|---|---|
| 8,583,314 | B2 | 11/2013 | De Oliveira et al. |
| 8,841,987 | B1 * | 9/2014 | Stanfield ............... B60R 25/241 |
| | | | 340/5.61 |
| 9,420,562 | B1 | 8/2016 | Cai et al. |
| 9,911,296 | B2 | 3/2018 | Luke et al. |
| 10,387,826 | B2 | 8/2019 | Simmons |
| 2003/0225707 | A1 | 12/2003 | Ehrman et al. |
| 2004/0004540 | A1 | 1/2004 | Komatsu et al. |
| 2004/0093291 | A1 * | 5/2004 | Bodin .................... B60R 25/33 |
| | | | 705/35 |
| 2004/0162063 | A1 * | 8/2004 | Quinones ............. G06Q 10/109 |
| | | | 455/419 |
| 2008/0228346 | A1 | 9/2008 | Lucas et al. |
| 2011/0313937 | A1 * | 12/2011 | Moore, Jr. ......... G07C 9/00896 |
| | | | 235/382 |
| 2015/0161969 | A1 | 6/2015 | Zaizen et al. |
| 2016/0027305 | A1 | 1/2016 | Inaba et al. |
| 2016/0275799 | A1 | 9/2016 | Smith |
| 2017/0294938 | A1 | 10/2017 | Mizutani et al. |

FOREIGN PATENT DOCUMENTS

| | | |
|---|---|---|
| JP | 2004306939 | 11/2004 |
| JP | 2010102611 | 5/2010 |
| JP | 2012073913 | 4/2012 |
| JP | 2013016119 | 1/2013 |
| JP | 2013016120 | 1/2013 |
| WO | 2012043239 | 4/2012 |

* cited by examiner

Fig.3

| Status information | | SSID | |
|---|---|---|---|
| | | Set SSID | Changed SSID |
| Engine driving | No | — | KUBOTA-025 |
| | Yes 025 | — | KUBOTA-028 |
| | Yes 028 | — | KUBOTA-026 |
| Operation device driving | No 026 | KUBOTA | — |
| | Yes 027 | — | KUBOTA-027 |
| Working machine vibration | No | KUBOTA | — |

Fig.7A

| Management number | Working machine information | |
|---|---|---|
| | Specifying information (First specifying information) | Machine type |
| 010-327-0050 | K-RX253200 | U-25 |
| 010-327-0051 | K-RX253201 | U-25 |
| 010-327-0052 | K-RX253202 | U-25 |
| 010-327-0053 | K-RX253203 | U-25 |
| ... | ... | ... |

Fig.7B

| Management number | Rental information | | | |
|---|---|---|---|---|
| | Specifying information (First specifying information) | Permitting information (Permitting command information) | Customer information | Rental period |
| 010-327-0050 | K-RX253200 | 015501-389761 | Osaka city | 9/1~9/25 |
| 010-327-0051 | K-RX253201 | 015501-389762 | Osaka city | 9/2~9/10 |
| 010-327-0052 | K-RX253202 | 015501-389763 | Osaka city | 9/4 |
| . . . | . . . | . . . | . . . | . . . |

Fig.8A

| Working machine information | |
|---|---|
| Specifying information (Second specifying information) | Machine type |
| B-US193207 | ... |
| K-PV100521 | U-25 |
| K-RX253200 | ... |
| F-XZ502102 | ... |
| ... | ... |

MANAGEMENT SYSTEM FOR WORKING MACHINE

CROSS-REFERENCE TO RELATED APPLICATIONS

This application is a Division of U.S. patent application Ser. No. 15/938,670 filed Mar. 28, 2018, which is a continuation application of International Application No. PCT/JP 2016/078274, filed Sep. 26, 2016, which claims priority to Japanese Patent Application No. 2015-191622, filed Sep. 29, 2015, Japanese Patent Application No. 2015-191623, filed Sep. 29, 2015, and Japanese Patent Application No. 2015-191624, filed Sep. 29, 2015. The content of each of these applications is incorporated herein by reference in its entirety.

FIELD OF THE INVENTION

The present invention relates to a management system for a working machine.

DISCUSSION OF THE BACKGROUND

A technique for monitoring a storage area of a vehicle is previously disclosed in Japanese Unexamined Patent Application Publication No. 2010-102611.

Japanese Unexamined Patent Application Publication No. 2010-102611, a line sensor capable of detecting a vehicle is installed at an entrance of a garage that is a storage area of the vehicle. Then, in watching out the storage area, the line sensor detects an intruder intruding towards the storage area, and thereby monitoring the storage area.

Meanwhile, a technique disclosed in Japanese Unexamined Patent Application Publication No. 2013-016119 is previously known as a conventional system for managing an expiration date of the working machine. The working machine disclosed in Japanese Unexamined Patent Application Publication No. 2013-016119 includes an expiration date storing means configured to store an expiration date, an operation restricting means configured to restrict the operation of the driving portion when the expiration date has come, an expiration date extending means configured to extend the expiration date, and a wireless communication terminal configured to receive a permission signal to permit extension of the expiration date when entering a preliminarily set wireless communication area.

Additionally, in the conventional rental system of the working machine, a rental company prepares an engine start key of the working machine to be lent (a rental working machine) when a rental reservation of the working machine is made as shown in Japanese Unexamined Patent Application Publication No. 2004-306939. The rental company deposits the prepared engine start key to a user who uses the rental working machine, and thus the user can drive the rental working machine.

SUMMARY OF THE INVENTION

An operation system of a working machine, the operation system being mounted on the working machine and including a first control device to control the working machine, and a first command device to output a command to the first control device in wireless, the command relating to control of the first control device. The first command device includes a first obtaining part to obtain an expiration date of the working machine from outside, a first time calculating part to obtain time, a third processing part to judge whether the time obtained by the first time calculating part meets the expiration date, and a sixth communication part to output a first command when the time meets the expiration date, the first command restricting control of the first control device, and to output a second command when the time does not meet the expiration date, the second command allowing the first control device to be controlled without restriction.

An operation system of a working machine, including a customer terminal, a controller mounted on the working machine to control operation of the working machine, a first management server configured to communicate with the customer terminal and to manage rental of the working machine, a second management server configured to communicate with the first management server and to manage manufacturing and/or selling the working machine, and a commander configured to communicate with the first management server and to output command to the controller. The customer terminal is configured to send to the first management server, customer request information indicating a machine type of the working machine and a rental period requested for the rental of the working machine, the first management server is configured to inquire the second management server whether the rental of the working machine of the customer request information is available, the second management server is configured to determine whether the rental of the working machine of the customer request information is available, send permission command information indicating availability of the rental to the first management server when the rental of the working machine is available, and send non-permission command information indicating unavailability of the rental to the first management server when the rental of the working machine is unavailable, the commander is configured to, after the first management server receives the permission command information, obtain the rental period of the customer request information, and output the command to the controller such that controlling the operation of the working machine by the customer is permitted before the rental period expires, and restricted after the rental period expires.

An operation system of a working machine, including a customer terminal, a controller mounted on the working machine to control operation of the working machine, a management server configured to communicate with the customer terminal, a commander configured to communicate with the management server and to output command to the controller. The customer terminal is configured to send to the management server, customer request information indicating a machine type of the working machine and a rental period requested for the rental of the working machine, the management server is configured to determine whether the rental of the working machine of the customer request information is available, send permission command information indicating availability of the rental to the commander when the rental of the working machine is available, and send non-permission command information indicating unavailability of the rental to the commander when the rental of the working machine is unavailable, the commander is configured to, after receiving the permission command information from the management server, obtain the rental period of the customer request information, and output the command to the controller such that controlling the operation of the working machine by the customer is permitted before the rental period expires, and restricted after the rental period expires.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a view illustrating a relation between status information and the SSID;

FIG. 7A is a view illustrating an example of working machine information:

FIG. 7B is a view illustrating an example of rental information;

FIG. 8A is a view illustrating an example of the working machine information;

DESCRIPTION OF THE EMBODIMENTS

Figure 1:
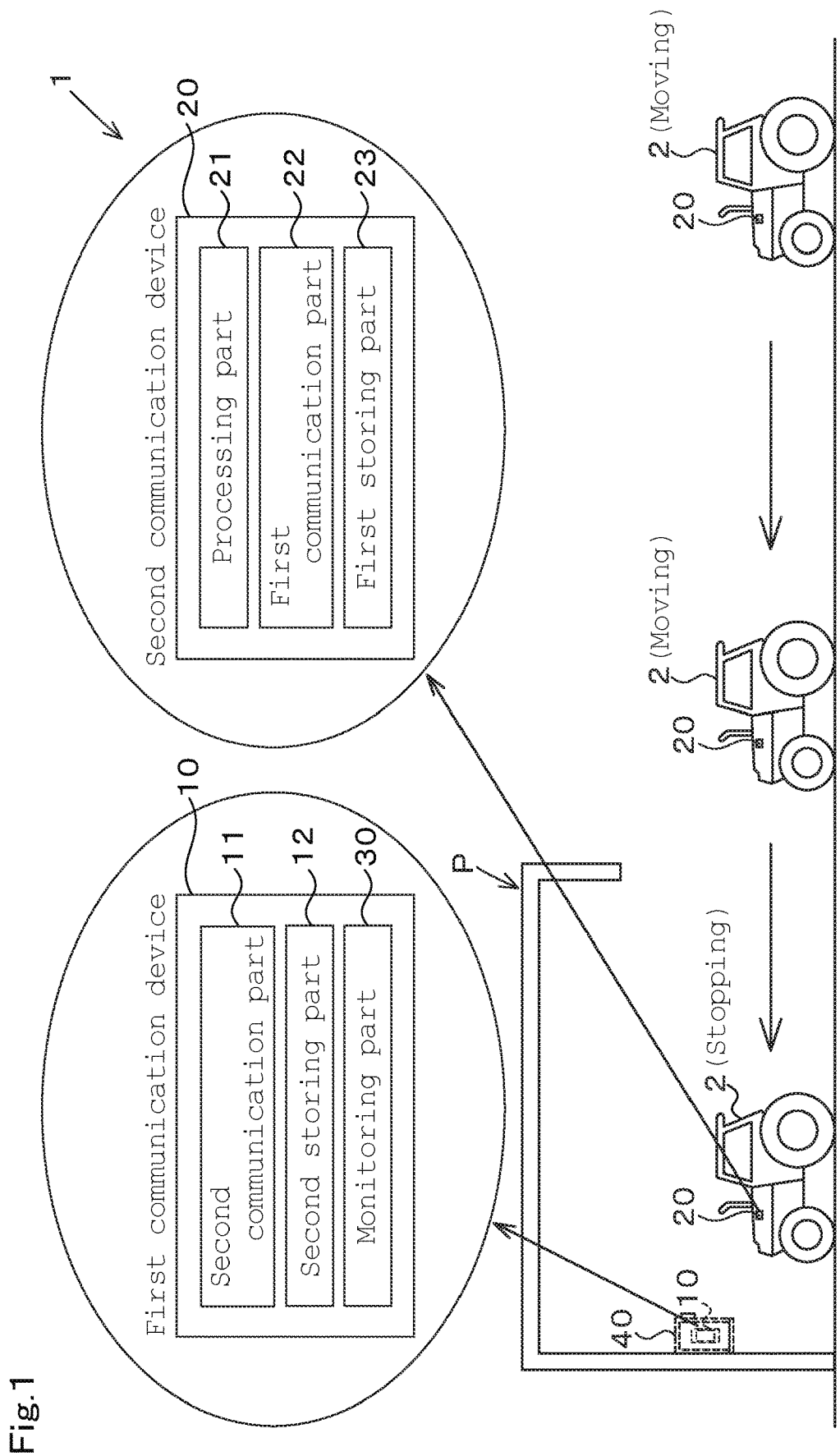
FIG. 1 is an overall view illustrating a monitoring system of a working machine according to a first embodiment.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, a management system for a working machine according to the present invention will be described with reference to the drawings appropriately.

The management system for the working machine includes a monitoring system for a working machine. The monitoring system of the working machine will be explained.

First Embodiment

FIG. 1 is an overall view illustrating the monitoring system of the working machine.

A monitoring system 1 of a working machine is a system configured to monitor (watch) a working machine 2 under a condition that the working machine 2 is stored in a storage area P. The working machine 2 is a construction machine such as a backhoe, an agricultural machine such as a tractor, a combine, a rice transplanter, a compact track loader, a skid steer loader, or the like. In the embodiments described below, a word "monitor" and a word "watch" are used equivalently and alternatively.

As shown in FIG. 1, the monitoring system 1 of the working machine includes a first communication device 10 (also referred to as a first wireless communicator 10) and a second communication device 20 (also referred to as a second wireless communicator 20).

The first communication device 10 is a communication device (also referred to as a communicator) installed at the storage area P of the working machine 2 or around the storage area P. The storage area P is, for example, a farmer's barn in the case where the working machine 2 is an agricultural machine, and the storage area P is a warehouse or a parking lot in the case where the working machine is a construction machine. The area around the storage area P is the vicinity of the storage area, for example, an entrance through which the working machine 2 passes in a barn or a warehouse, a roof of a barn, a roof of a warehouse, and the like. As a matter of course, the storage area P is not limited to the above-described example, but may be a predetermined location area for storing the working machine, A housing box 40 is arranged on a wall or a pillar of the storage area P such as a barn. The housing box 40 is configured to house the first communication device 10.

The first communication device 10 is constituted of a communication module configured to perform the short range wireless communication such as the WiFi®, the Bluetooth®, the ZigBee®, and the like. It should be noted that the first communication device 10 may be constituted of a smartphone, a tablet PC, or the like having a communication module. The first communication device 10 is necessarily arranged at the storage area P or around the storage area P in the case where it is required to monitor (watch) the working machine 2. For example, when the first communication device 10 is constituted of a communication module, the communication module is housed in the housing box 40, and is stably arranged at the storage area P or around the storage area P. On the other hand, when the first communication device 10 is constituted of a portable device such as a smartphone, a tablet PC, or the like, the first communication device 10 is housed in the housing box 40 in the monitoring of the working machine 2, and thus the first communication device 10 cannot be carried only during the monitoring.

The second communication device 20 is constituted of a communication device (also referred to as a communicator) mounted on the working machine 2 and configured to communicate with the first communication device 10 in wireless. The second communication device 20 is constituted of a communication module configured to performing the short range wireless communication such as the WiFi®, the Bluetooth®, the ZigBee® or the like. Note that a communication module connectable to a mobile phone communication network may be mounted on the second communication device 20.

The first communication device 10 and the second communication device 20 will be described in detail below.

The second communication device 20 will be described at first.

The second communication device 20 is connected to an in-vehicle communication network provided in the working machine 2. The second communication device 20 includes a processing part 21, a first communication part (an output part) 22, and a first storing part (memory) 23. The processing part 21 is constituted of a CPU and the like.

The processing part 21 is configured to obtain information (also referred to as status information) of the working machine, the information flowing in the in-vehicle communication network. For example, the processing part 21 is configured to obtain values of sensors (an accelerator pedal sensor, an engine revolution detection sensor, a crank position sensor, a fuel sensor, a water temperature sensor, a vibration sensor, and the like) mounted on the working machine 2 as the status information. In addition, the processing part 21 is configured to obtain, as the status information, the states (ON, OFF) of switches (an ignition switch, a parking brake switch, a PTO switch, or the like) mounted on the working machine 2 or a control signal of a control part such as a CPU and the like mounted on the working machine 2.

Further, the processing part 21 adds the acquired state (the status information) of the working machine to the transmitted signal. Here, the transmitted signal is a broadcast signal used in the wireless communication between the first communication device 10 and the second communication device 20, and is a signal including a Service Set IDentifier (SSID) and the like.

The processing part 21 adds the status information to the SSID. For convenience of the description, the predetermined SSID may be referred to as a "set SSID" below and the SSID to which the status information is added may be referred to as a "changed SSID" below.

Figure 2:
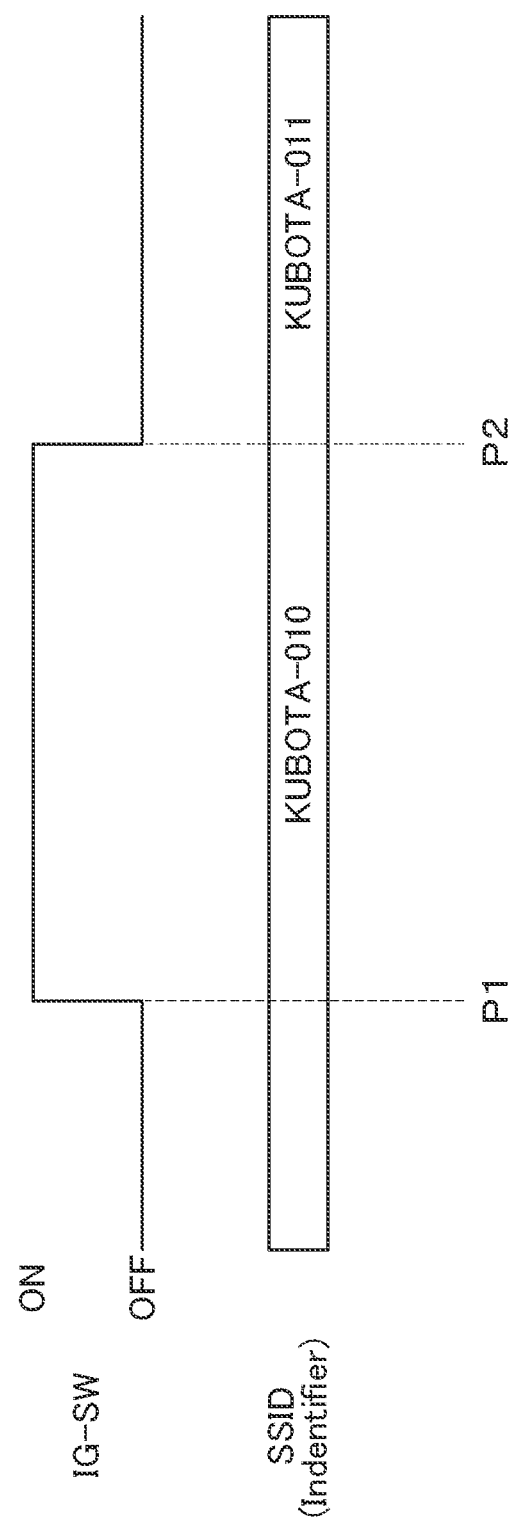
FIG. 2 is a view illustrating a relation between an ignition switch and an SSID.

FIG. 2 is a view illustrating the changing of the SSID.

As shown in FIG. 2, when the ignition switch (the IG-SW) of the working machine changes from being turned-off (OFF) to being turned-on (ON) at time P1, the processing part 21 obtains key-on information that is the status information indicating that the ignition switch is turned on. When the processing part 21 obtains the key-on information, the processing part 21 adds the key-on information to the set SSID "KUBOTA", and thereby configures the changed SSID "KUBOTA-010". That is, the processing part 21 adds "010" to the end of the set SSID, the "101" indicating that the ignition switch is turned on. Meanwhile, the symbol shown between the set SSID "KUBOTA" and the "010" indicates the separation between the set SSID and the key-on information newly added.

In addition, when the ignition switch (the IG-SW) changes from being turned-on (ON) to being turned-off (OFF) at time P2, the processing part 21 obtains key-off information that is the status information indicating that the ignition switch is turned off. When the processing part 21 obtains the key-off information, the processing part 21 adds the key-off information to the set SSID "KUBOTA", and thereby configures the changed SSID "KUBOTA-011". That is, the processing part 21 adds the "011" to the end of the set SSID, the "011" indicating that the ignition switch is turned off. Thus, in the processing part 21, the status information indicating ON/OFF of the ignition switch can be added to the set SSID.

In the embodiment described above, the status information relating to the turning-on and the turning-off of the ignition switch has been described; however, it is obvious that the status information is not limited to that.

In the embodiment of the present invention, it is preferable to add the status information to the SSID, the status information allowing the movement (the driving) of the working machine to be confirmed. As shown in FIG. 3, it is preferable to add, to the SSID, the status information, for example, indicating the presence or absence of starting of the engine, presence or absence of driving of the working device, presence or absence of vibration of the working device, presence or absence of running, and the like. Meanwhile, the presence or absence of starting of the engine can be detected by the engine revolution detection sensor or the crank position sensor. The presence or absence of starting of the working machine can be detected by the turning-on or the turning-off of the PTO switch of the working device. The presence or absence of vibration of the working machine can be detected by the vibration sensor.

Thus, according to the processing part 21, it is possible to add, to the set SSID, the status information on which the presence or absence of driving of the working machine, that is, the change of driving of the working machine can be recognized.

In generating the changed SSID, the processing pail 21 adds, to the end of the set SSID, numeric numbers or the like (for example, 010, 011) indicating the status information; however, the numeric number or the like indicating the status information may be added to any position in the set SSID. In addition, the processing part 21 may change the set SSID based on the predetermined status information in accordance with a predetermined calculation formula or the like. Further, the relation between the status information obtained by the processing part 21 and the numeric number indicating the status information is stored in advance in the second communication device 20, and the processing part 21 generates the changed SSID with use of the relation.

The first communication part 22 is constituted of a computer chip or the like configured to perform the short range wireless communication, and executes the wireless communication in the Wi-Fi (a registered trademark) conforming to the IEEE 802.11 series that is the communication standard, for example. The first communication pail 22 receives data (information) received from the first communication device 10, and outputs the transmitted signal to the first communication device 10, the transmitted signal including the SSID (the set SSID, the changed SSID).

The first storing part 23 is constituted of a nonvolatile memory or the like. The first storing part 23 is configured to store communication information relating to the communication, the status information, data used for generating the changed SSID, and the like. The communication information is, for example, a MAC address uniquely determined on the network, an identifier (the set SSID, the changed SSID) used for identifying the second communication device 20, an encryption key (a network key), and the like.

The first communication device 10 includes a second communication part 11 and a second storing part (a memory) 12.

The second communication part 11 is constituted of a computer chip or the like configured to perform the short range wireless communication, and configured to execute the wireless communication in the Wi-Fi (a registered trademark) conforming to the IEEE 802.11 series that is the communication standard, for example. In addition, the second communication part 11 may be another one configured to perform the communication on a data communication network or the mobile phone communication network.

The second storing part 12 is constituted of a nonvolatile memory or the like. The second storing part 12 is configured to store the communication information and the status information obtained from the second communication device 20. The communication information stores, for example, a MAC address uniquely determined on the network, an encryption key (a network key), an e-mail (a notification destination), and the like.

The monitoring system 1 of the working machine is provided with a monitoring part (a monitor) 30 configured to monitor (watch) the working machine. The monitoring part 30 is disposed on the first communication device 10. The monitoring part 30 is constituted of electric components, electronic components, programs, and the like incorporated in the first communication device 10.

The monitoring part 30 outputs a warning to the outside when the state of the working machine changes during the monitoring (the watching) (after starting the monitoring).

For example, the monitoring part 30 outputs the warning to the outside when detecting, during the monitoring (the watching), that the engine of the working machine starts from a stopped state and that the working machine starts moving from a parking state.

The monitoring (the watching) of the working machine 2 will be described in detail with reference to FIG. 1.

As shown in FIG. 1, prior to the monitoring (the watching) of the working machine 2, the first communication device 10 is housed in the housing box 40. For example, in the case where the first communication device 10 is constituted of a portable communication device (also referred to as a portable communicator), the first communication device 10 is housed in the housing box 40, the housing box 40 is locked, and then the first communication device 10 is constantly fixed in the housing box 40 at the time of monitoring (watching) the working machine 2. In that case, only when the monitoring (the watching) of the working machine 2 is not operated, it is possible to take out the first communication device 10 from the housing box 40. On the other hand, when the first communication device 10 is constituted of a non-portable device that cannot be carried, the first communication device 10 is constantly housed in the housing box 40.

A communication range (a communication distance) of the first communication device 10 is configured to have a size approximately same as that of the storage area P. The communication range (the communication distance) of the first communication device 10 may be larger than the storage area IP and may be a range where as long as a radio wave from the second communication device 20 can be received at a position where the working machine 2 stops in the storage area P.

When the working operation by the working machine 2 finishes, the working machine 2 carrying the second communication device 20 comes back to the barn P The second communication device 20 of the working machine 2 outputs the SSID to the outside at regular intervals (for example, every second, every several seconds). The interval at which the second communication device 20 outputs the SSID is not limited to the above-described examples.

When the working machine 2 enters the storage area and stops at a predetermined place, the driving of the working machine is stopped. For example, the ignition switch of the working machine is turned off, and the driving of the engine and the working device is stopped.

When the working machine 2 enters the barn P and the ignition switch is turned off, as described above, the processing part 21 of the second communication device 20 generates the changed SSID to which "011" is added, the "011" indicating that the ignition switch is turned off. The first communication part 22 outputs the changed SSID to the outside. On the other hand, the second communication part 11 of the first communication device 10 can obtain the changed SSID outputted from the second communication device 20. That is, the first communication device 10 can know through the changed SSID that the working machine 2 has stopped (the driving of the working machine 2 has stopped).

Now, the monitoring part 30 monitors (watches) the working machine 2 on the basis of the radio waves in the communication between the first communication device 10 and the second communication device 20. In the case of the example described above, since the information (011) indicating the stop of the working machine 2 is included in the radio wave (the changed SSID) received by the first communication device 10, the monitoring part 30 starts to monitor (watch) the working machine on which the second communication device 20 is mounted when the first communication device 10 receives the changed SSID indicating the stop of the working machine 2. As a matter of course, the information indicating the stop of the working machine 2 is not limited to "011", but may be "025" indicating the absence of the driving of the engine or other information.

The monitoring part 30 sounds a warning inside and outside the storage area P when the first communication device 10 receives the changed SSID (the "KUBOTA-010") from the second communication device 20 after the ignition switch of the working machine 2 is turned on during the monitoring (during the watching). Alternatively, the monitoring part 30 notifies the notification destination such as the electronic mail of the change of the working machine, the notification destination being stored in the second storing part 12 of the first communication device 10. The warning may be issued in any type of configurations, and the warning may be informed by the sound and may be notified by the light.

Regarding termination of the monitoring (the watching) by the monitoring part 30, the first communication device 10 is provided with an inputting part for example, a password inputted to the inputting part is compared with a password that is stored in advance in the second storing part 12 of the first communication device 10, and then the monitoring is terminated (the monitoring is released) when the passwords are matched with each other. Meanwhile, the termination of the monitoring is not particularly limited. For example, the second communication device 20 is provided with an inputting part, and a password inputted to the inputting part is transmitted to the first communication device 10. Then, the password transmitted from the second communication device 20 is compared with the password stored in the second storing part 12 of the first communication device 10, and the monitoring may be terminated when the passwords are matched with each other or may, be terminated in another method.

As described above, when the radio wave (the SSI D) received by the first communication device 10 includes the information indicating the stop of the working machine, the monitoring part 30 starts to monitor the working machine 2 on which the second communication device 20 is mounted, and thus the monitoring of the working machine 2 can be easily carried out without using a large-scale apparatus such as an imaging device.

In the above-described embodiment, when the radio wave (the changed SSID) in the communication between the first communication device 10 and the second communication device 20 includes the stop of the working machine 2, the monitoring part 10 monitors the working machine 2; however, instead of that, the monitoring part 30 may start the monitoring with use of a strength (a receiving intensity) of the radio wave received from the second communication device 20 by the first communication device 10.

The monitoring of the working machine based on the receiving intensity of the first communication device 10 will be described below.

As shown in FIG. 1, under a state where the first communication device 10 is housed in the housing box 40, the second communication device 20 and the first communication device 10 are separated from each other at a place where the working machine 2 is separated from the storage area P, and thus the receiving intensity of the first communication device 10 with respect to the second communication device 20, that is, the receiving intensity of a signal such as a transmitted signal is small. In particular, when the second communication device 20 is located outside the communication area as viewed from the first communication device 10, the first communication device 10 is not capable of receiving a signal such as a transmitted signal from the second communication device 20. That is, when the first communication device 10 is not capable of receiving the signal from the second communication device 20, it can be said that the working device mounting the second communication device 20 is separated from the storage area P.

When the working machine gradually approaches the storage area P and the distance between the first communication device 10 and the second communication device 20 becomes short, the first communication device 10 receives the transmitted signal transmitted from the second communication device 20. That is, when the distance between the first communication device 10 and the second communication device 20 becomes short, the receiving intensity of the transmitted signal transmitted by the second communication device 20 gradually increases. Here, when the receiving intensity of the first communication device 10 becomes equal to or more than a predetermined value (also referred to as a threshold intensity), the monitoring part 30 starts the monitoring. That is, when the receiving intensity of the first communication device 10 becomes equal to or higher than the predetermined value due to the working machine entering into the storage area P, the monitoring part 30 starts the monitoring. Thus, only when the working machine enters into the storage area P, it is possible to automatically start to monitor the working machine. In particular, in the case where a plurality of the working machines are stopped and stored at the storage area P, it is possible to increase the number of the working machines to be monitored every time when each of the working machines returns from the working site to the storage area P. Meanwhile, the predetermined value (the threshold intensity) to judge the strength of the radio intensity is the radio intensity of the case where the working machine 2 reaches the storage area (in the case of entering the storage area), and can be obtained by experiments and theoretical equations.

For example, when the receiving intensity of the first communication device 10 is less than the predetermined value during the monitoring (after starting of the monitoring), the monitoring part 30 outputs a warning to the outside because the working machine 2 may be separated from the storage area P. The monitoring may be started based on the radio wave intensity, and then the state and the like of the working machine 2 may be monitored based on the status information (the SSID) as described above.

In addition, in the case where the monitoring part 30 executes the monitoring only based on the receiving intensity of the first communication device 10, the processing part 21 of the second communication device 20 may generate no changed SSID, and the second communication device 20 may output radio waves (for example, the set SSID) to the outside.

In the example described above, the monitoring part 30 starts the monitoring when the receiving intensity of the first communication device 10 becomes equal to or higher than the predetermined value; however, in addition to that, the monitoring may be started in synchronization with the operations of the working machine returning from the working site to the storage area P The construction machines such as the backhoe and the agricultural machines such as the tractor, the combine, and the rice transplanter are often carried on a transport vehicle such as a truck and the like and return from the working site to storage area P. The construction machine and the agricultural machine stops the driving during the transportation on the transport vehicle. That is, the construction machine and the agricultural machine are transported from the working site to the storage area P under the state where the ignition switch is turned off (the state where the engine is stopped). Then, when the transport vehicle arrives at the storage area P or around the storage area P, the construction machine or the agricultural machine turns the ignition switch and the like from off to on, starts the engine and runs itself, and turns the ignition switch off when the construction machine or the agricultural machine comes to the stop position in the storage area P again.

In other words, looking at the process of the returning of the working machine (the construction machine, the agricultural machine) from the working site to the storage area. P, the ignition switch is turned off until reaching the storage area P. and when reaching the storage area P, the ignition switch is turned on and then turned on. Thus, the monitoring part 30 starts the monitoring when the ignition switch of the working machine (the construction machine, the agricultural machine) is turned on from off (when the changed SSID has changed from KUBOTA-011 to KUBOTA-010) under the condition that the receiving intensity of the first communication device 10 is equal to or higher than the predetermined value out of the monitoring, monitoring is started. The monitoring may be performed when the ignition switch of the working machine is turned on from off and then further turned off from on.

According to that configuration, it is possible to more reliably detect that the working machine has returned to the storage area P on the basis of the state of the receiving intensity of the first communication device 10 and further on the basis of the turning of the ignition switch of the working machine, and then the monitoring of the working machine can be performed.

It should be noted that the monitoring process after the start of the monitoring may be performed only based on the radio wave intensity, may be performed only based on the change of the SSID (the status information), or may be performed based on both of the radio wave intensity and the SSID.

Meanwhile, the working machine vibrates under a state where the working machine is driven. As described above, it can be known from the changed SSID whether the working machine is vibrating or not. Thus, the monitoring part 30 may start the monitoring when the vibration of the working machine disappears (the vibration cannot be detected) under the condition that the receiving intensity of the first communication device 10 is equal to or higher than the predetermined value. Meanwhile, the monitoring part 30 may start the monitoring when all of three conditions are all met, the first condition being that the receiving intensity of the first communication device 10 is equal to or higher than the predetermined value, the second condition being that the ignition switch has changed from being turned off to being turned on, and the third condition being that vibration is not detected.

Since the distance between the first communication device 10 and the second communication device 20 is constantly close in the state where the working machine stays at the storage area P, that is, in the state where the working machine is stopped at the storage area P, the receiving intensity of the communication device 10 is constantly equal to or higher than the predetermined value. Thus, the monitoring part 30 may start the monitoring in the case where time for which the receiving intensity of the first communication device 10 is equal to or higher than the predetermined value, that is, elapsed time during which the receiving intensity is continuously equal to or higher than the predetermined value is a predetermined period of time or longer. The predetermined period of time is a time length for which the working machine is considered to be stopped and stored at the storage area P, for example, several minutes (2 or 3 minutes). As a matter of course, the numeric values are not limited to that; however, it is desirable not to exceed 10 minutes. According to that, even when the state of the working machine, such as the state of the ignition switch and the state of vibration, cannot be obtained, it is possible to automatically monitor the working machine.

Second Embodiment

Figure 4:
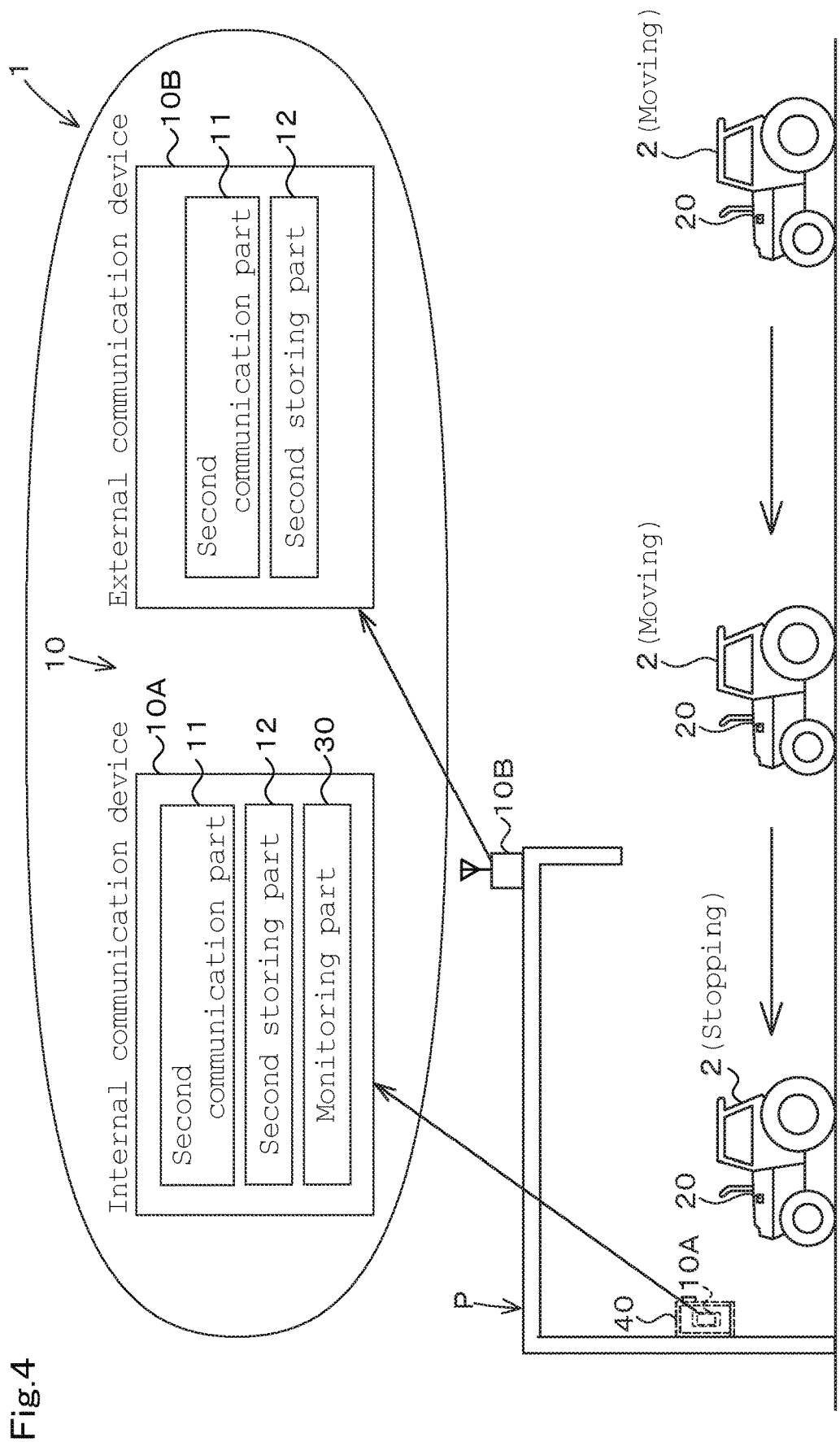
FIG. 4 is an overall view illustrating a monitoring system of a working machine according to a second embodiment of the present invention.
Figure 5:
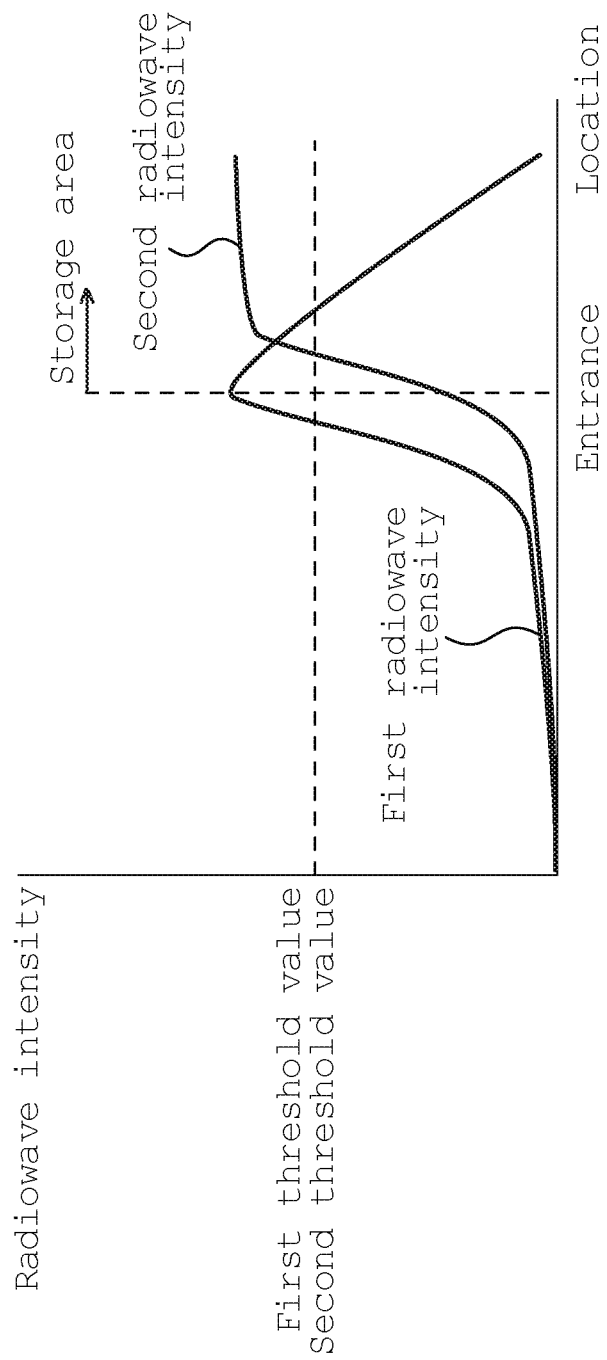
FIG. 5 is an explanation view explaining a radio wave intensity.

FIG. 4 shows a monitoring system for a working machine according to a second embodiment. As shown in FIG. 4, in the monitoring system of the working machine, the first communication device 10 includes an internal communication device 10A (also referred to as an internal wireless communicator 10A) and an external communication device 10B (also referred to as an external wireless communicator 10B). The internal communication device 10A is constituted of a communication device (also referred to as a communicator) arranged in the storage area and configured to perform the wireless communication with the second communication device 20. The external communication device 10B is constituted of a communication device (also referred to as a communicator) arranged outside the storage area and configured to perform the wireless communication with the second communication device 20. That is, as shown in FIG. 4, the monitoring system 1 of the working machine is a system arranging the first communication device 10 inside and outside the storage area P.

The internal communication device 10A is housed in the housing box 40 arranged on a pillar of the barn P, for example. The communication range (the communication distance) of the internal communication device 10A is configured to have a size approximately same as the storage area P. Meanwhile, the communication range (the communication distance) of the internal communication device 10A may be larger than the storage area P. and may be a range where as long as a radio wave from the second communication device 20 can be received at a position where the working machine 2 stops in the storage area P.

The external communication device 10B is, for example, arranged on the roof of the barn P or outside the entrance of the barn P. Each of the internal communication device 10A and the external communication device 10B has a second communication part 11 and a second storing part 12.

The monitoring part 30 is provided in the internal communication device 10A. The internal communication device 10A and the external communication device 10B are connected to each other, and the internal communication device 10A is configured to obtain the receiving intensity of the radio wave received by the external communication device 10B (the radio wave transmitted from the second communication device 20). Hereinafter, for convenience of explanation, the radio wave received by the external communication device 10B is referred to as a "first radio wave", the radio wave received by the internal communication device 10A is referred to as a "second radio wave", the radio wave intensity of the first radio wave in the external communication device 10B is referred to as a first radio wave intensity, and the radio wave intensity of the second radio wave in the internal communication device 10A is referred to as a second radio wave intensity.

In the embodiment of the present invention, it is preferable to add the status information to the SSID, the status information allowing the movement (the driving) of the working machine to be confirmed. As shown in FIG. 3, it is preferable to add, to the SSID, the status information, for example, indicating whether or not the engine has started, whether the working device has been activated or deactivated, whether or not the working device is vibrating, whether or not the working device is running, and the like. Meanwhile, whether or not the engine has started can be detected by the engine revolution detection sensor or the crank position sensor. Whether the working device has been activated or deactivated can be detected by the turning-on or the turning-off of the PTO switch of the working device. Whether or not the working device is vibrating can be detected by the vibration sensor.

Thus, according to the processing part 21, it is possible to add, to the set SSID, the status information indicating whether the working device has been activated or deactivated, that is, the change of activation/deactivation of the working machine.

In this manner, when the transition of the first radio wave intensity of the external communication device 10B is watched, it is possible to know whether the working machine 1 is approaching or separating away from the storage area P. In addition, when the second radio wave intensity of the internal communication device 10A is watched, it is possible to know whether or not the working machine 1 has entered the storage area P For example, if the first radio wave intensity of the external communication device 10B is equal to or higher than the predetermined value but the second radio wave intensity of the internal communication device IA is less than the predetermined value, it is possible to know that the working machine 2 stays near the storage area P but does not stay in the storage area P.

That is, the monitoring part 30 determines whether or not to monitor the working machine 2 with use of both of the first radio wave intensity and the second radio wave intensity, and thus it is possible for the monitoring part 30 to monitor the working machine 2 returning to the storage area P from the outside.

Third Embodiment

The management system of the working machine includes an operation system of the working machine. The operation system of the working machine will be described below.

The operation system of the working machine is a system configured to manage an operation of the working machine, and can be applied to a rental system of the working machine, for example. Prior to explanation of the operation system of the working machine, the renting system of the working machine will be explained below. The operation system of the working machine can be applied to a system other than the rental of the working machine, and is not limited to the rental system of the working machine described below.

Figure 6:
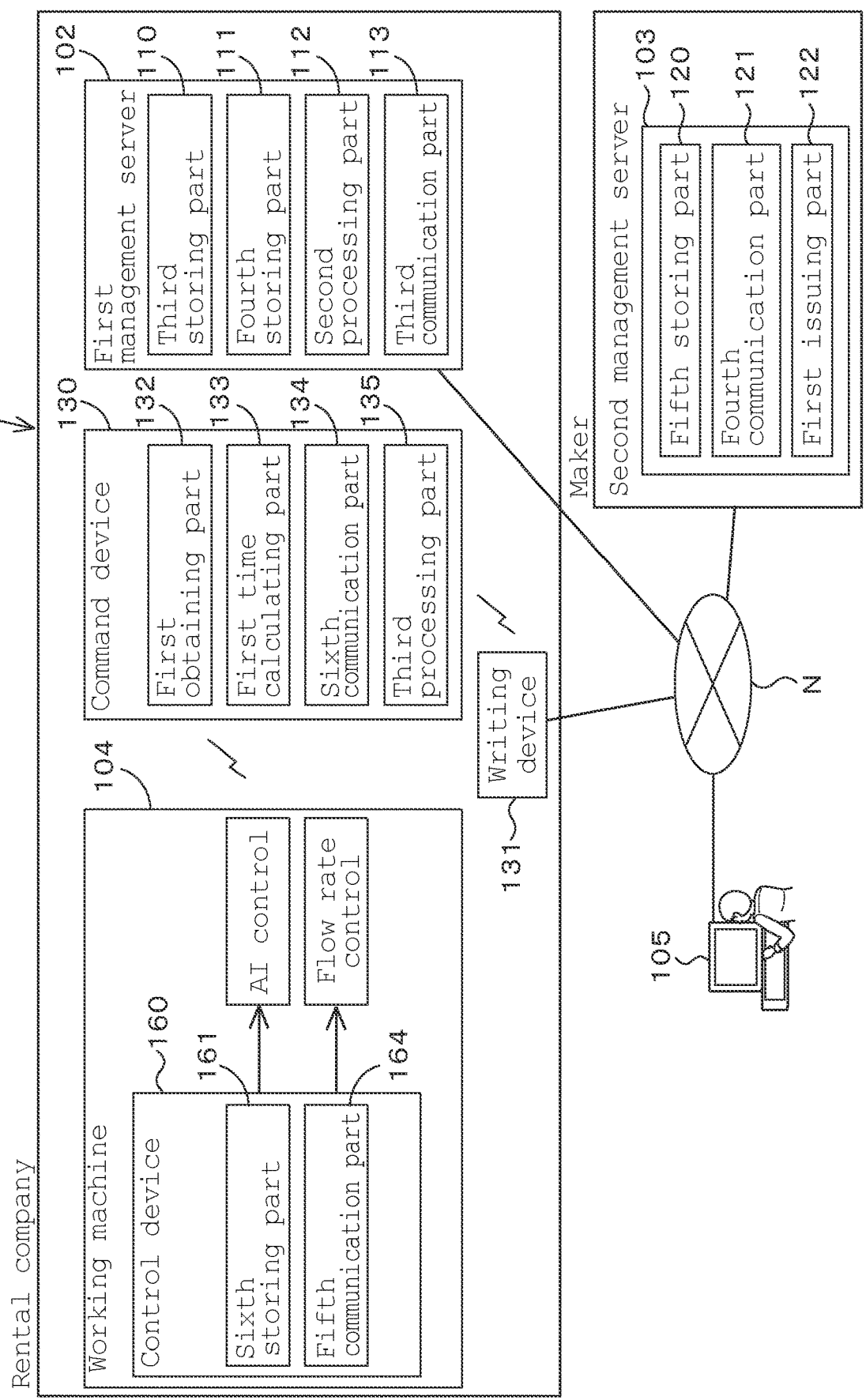
FIG. 6 is a schematic view illustrating a rental system of a working machine according to a third embodiment of the present invention.

FIG. 6 is a schematic diagram of the rental system of the working machine.

The rental system 101 of the working machine is a system configured to perform a rental system of a working machine such as a construction machine (for example, a backhoe), an agricultural machine (for example, a tractor, a combine, a rice transplanter).

As shown in FIG. 6, the rental system 101 of the working machine includes a first management server 102 and a second management server 103.

The first management server 102 is constituted of a server configured to manage the rental of the working machine 104, and is owned by a rental company or the like, for example. The second management server 103 is owned by a maker or the like who manufactures or sells the working machine 104. The first management server 102 and the second management server 103 can transmit and receive data with each other through a network N. For example, the second management server 103 can provide, to the first management server 102, various information (parts information, specification information, an operation manual, maintenance information, and the like) relating to manufacturing or sales of the working machine 104. On the other hand, the first management server 102 can provide information on the rental to the second management server 103 as described later.

Various types of devices (referred to as communication devices (communicators)) 105 can be connected to the first management server 102 through the network N. For example, a communication device 5 (also referred to as a communicator 5) such as a personal computer (a PC), a smart phone (a multifunctional mobile phone), a PDA (a mobile terminal), a tablet, or the like can be connected to the first management server 102. The communication device 105 (also referred to as the communicator 105) is connected to the first management server 102, and thereby a processing relating to the rental of the working machine 104 can be performed.

In order to lend the working machine 104, the communication device 105 is connected to the first management server 102 at first. In response to the connection of the communication device 105, the first management server 102 displays an input screen (for example, a Web screen) on the communication device 105. Items (information) required for the rental can be inputted to the input screen displayed on the communication device 105. For example, customer request information (a machine type of the working machine requested for rental, the requested number of the working machines, a rental period, and the like) and rental customer information related to a customer who borrows the working machine (a rental customer) (that is, an address, a name, a phone number, and the like of the rental customer) can be inputted to the input screen.

The first management server 102 judges, based on the customer request information, whether or not the requested working machine 104 can be lent during a requested rental period, and if the working machine 104 can be lent out during the requested rental period, the first management server 102 inquires of the second management server 103 about permission of rental. When the rental is permitted by the second management server 103, the first management server 102 carries out a predetermined process such that the working machine can be lent. In this manner, in the rental system 101 of the working machine, the first management server 102 and the second management server 103 are made to cooperate each other to lend the working machine 104.

Hereinafter, the first management server and the second management server will be described in detail.

The first management server 102 includes a third storing part (a first working machine information storing part) 110 (a third memory 110), a fourth storing part (a rental information storing part) 111 (a fourth memory 111), a processing part (a second processing part) 112, a third communication part 113. The third storing part 110 and the fourth storing part 111 are constituted of a nonvolatile memory and the like. The second processing part 112 and the third communication part 113 are constituted of electric/electronic parts, computer programs, and the like incorporated in the first management server 102.

The third storing part 110 stores information (also referred to as working machine information) of the working machine owned by the rental company. For example, the third storing part 110 stores a management number of the working machine, specifying information of the working machine, a machine type of the working machine, and the like as shown in FIG. 7A. The management number of the working machine is the number that the rental company has given for management of the rental. The specifying information of the working machine is information specifying the working machine and is unique information (for example, a manufacturing number, a serial number, and the like) assigned to the working machine. The machine type of the working machine is a name and the like uniquely determined by the manufacturer depending on the specifications of the working machine, the size of the working machine, and the like.

The fourth storing part 111 stores information on the rental of the working machine (referred to as rental information). For example, as shown in FIG. 713, the fourth storing part 111 stores, as the rental information, the management number of the lent working machine, the specifying information of the working machine, the permitting information, the rental customer information, the rental period, and the like. The permitting information is a number and the like (permission command information) indicating permission of the rental, the number being notified from the second management server 103 at the time for the rental.

The third communication part 113 is a device configured to transmit and receive various types of information with the second management server 103, the communication device 105, and the like. The third communication part 113 is configured to transmit and receive a predetermined type of information in accordance with the processing of the first management server 102, the second management server 103, and the communication device 105.

The second processing part 112 is a unit configured to perform various types of processing related to the rental. For example, when the communication device 105 is connected to the first management server 102 and when a request to carry out the rental (a request for the input screen) is issued to the first management server 102, the second processing part 112 performs a processing to display the input screen on the communication device 105. In addition, when the rental customer information, the customer request information, and the like are inputted to the input screen, the second processing part 112 performs a processing to judge whether or not a requested working machine can be lent out during a requested rental period based on the customer request information. Specifically, the second processing part 112 calculates how many the working machines of the model requested for the rental are owned with reference to the models of the working machines stored in the third storing part 110. That is, the second processing part 112 calculates the number of the working machines of the model owned by the rental company in the model requested for the rental. Note that the working machines may be sorted in advance for each model, and thereby the number of owned machines may be stored in the third storing part 110.

Then, referring to the fourth storing part 111, the second processing part 112 calculates the number of the working machines that are already lent (the number of lent units) during the rental period, and then calculates the number of the working machines ready to be lent (referred to as the ready-for-rental number) on the basis of the number of lent units and the number of owned units. In the case where the ready-for-rental number is equal to or more than the requested number, the second processing part 112 determines that the requested working machine can be rented to the rental customer.

For example, when the ready-for-rental number is three and the requested number is five, it is possible to rent at least the three working machines corresponding to the ready-for-rental number. In that case, the second processing part 112 notifies the communication device 105 of the ready-for-rental number, requests the communication device 105 to change the requested number, and the second processing part 112 determines that the rental can be carried out if the requested number after the change is equal to or less than ready-for-rental number.

The second processing part 112 transmits the first information to the second management server 103 from the third communication part 113 when the second processing part 112 determines that it is possible to rent a requested working machine, that is, when a rental reservation for the second processing part 112 is made. The first information is information on a predetermined working machine, that is, a working machine that can be rented, and is information managed by the first management server 102. The first information is the management number of the working machine, the specifying information that specifies the working machine, the model of the working machine, and the like.

In the embodiment, when the rental reservation is made for the working machine, the second processing part 112 refers to the third storing part 110 and the fourth storing part 111 and extracts the specifying information (referred to as "first specifying information") of the working machine same as the requested working machine. The third communication part 113 transmits, to the second management server 103, the rental permission request and the first information including the first specifying information extracted by the second processing part 112.

Now, the second management server 103 has a fifth storing part (a second working machine information storing part) 12.0 (a fifth memory 120), a fourth communication part 121, and a first issuing part 122. The fifth storing part 120 is constituted of a nonvolatile memory or the like. The fourth communication part 121 and the first issuing part 122 are constituted of electric/electronic parts, computer programs, and the like incorporated in the second management server 103.

The fifth storing part 120 stores information on the manufactured working machine or information on the sold working machine. The information on the manufactured working machine or the information on the sold working machine are referred to as second information. For example, the fifth storing part 120 stores, as the second information, specifying information of the working machine, a model of the working machine, and the like as shown in FIG. 8A.

The fourth communication part 121 is a device configured to transmit and receive various information to and from the first management server 102 and the like. The fourth communication part 121 receives and transmits predetermined information in accordance with the processing of the first management server 102, the second management server 103, and the like.

The first issuing part 122 refers to the first information transmitted from the first management server 102 and the second information stored in the fifth storing part 120 at first, and determines a working machine to which a rental permission is given (referred to as a rental working machine). Specifically, when the first management server 102 receives the rental permission request and the first information including the first specifying information, the first issuing part 122 starts the determining process in response to the rental permission request. The first issuing part 122 judges whether or not the second specifying information corresponding to the first specifying information received by the first management server 102 is stored in the fifth storing part 120.

Figure 8B:
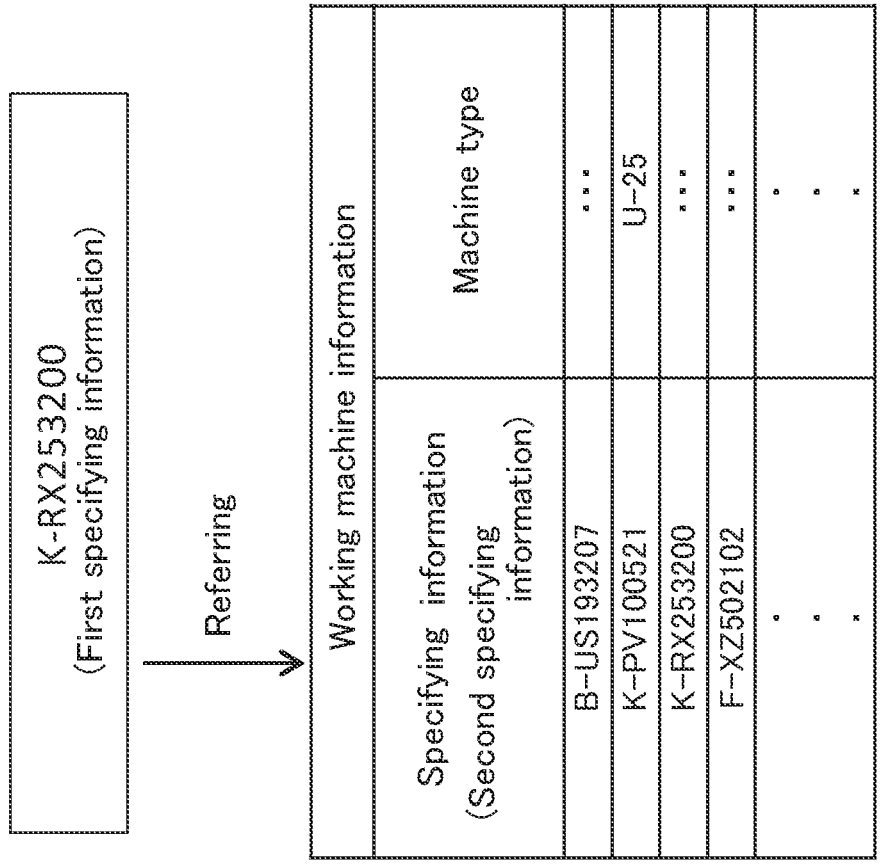
FIG. 8B is a view explaining finding of specifying information carried out by an issuing part.

For example, as shown in FIG. 8B, when the first specifying information is "K-RX 253200", the first issuing part 122 refers to the fifth storing part 120 and judges whether the second specifying information indicated by the "K-RX 253200" is stored in the fifth storing part 120. In that case, the "K-RX 253200" is stored as the second specifying information in the fifth storing part 120, and thus the first issuing part 122 determines that the second specifying information corresponding to the first specifying information is stored (the presence of the working machine).

In the case of the presence of the working machine, the first issuing part 122 determines, as the rental working machine permitted for the rental, a working machine corresponding to the first specifying information ("K-RX 253200") that is matched with the second specifying information ("K-RX 253200"), and issues command information indicating that the working machine has been determined (referred to as the permission command information). The permission command information is information indicating that the working machine of the first specifying information is determined as the rental working machine (the information indicating the rental permission), and is indicated by numerals of several digits or the like. In addition, the permission command information is associated with the working machine in advance, and the second specifying information ("K-RX 253200") and the permission command information are associated with each other in advance. That is, the first issuing part 122 issues the permission command information preliminarily associated with the second specifying information.

Thus, the first issuing part 122 issues the associated permission command information in response to the first specifying information notified from the first management server 102, and thereby the first issuing part 122 issues the rental permission to the working machine of the first specifying information.

In the above description, the first issuing part 122 provides a flag or the like indicating the rental permission on the first specifying information notified from the first management server 102 to set the permission command information (the permitting information), and thereby the rental permission may be given to the working machine of the first specifying information.

On the other hand, when the first specifying information is "K-253800", the "K-253800" is not stored in the fifth storing part 120 as the second specifying information, and thus the first issuing part 122 determines that the second specifying information that is matched with the first specifying information is not stored (the working machine is not there). When the working machine is not there, the first issuing part 122 regards the working machine corresponding to the first specifying information (the "K-253800") as a working machine that cannot be rented, and issues the non-permission command information indicating that the rental is not permitted. In that case, the non-permission command information is information indicating that the working machine of the first specifying information is a working machine to which the rental permission cannot be given (information indicating non-permission for the rental).

The fourth communication part 121 of the second management server 103 transmits the permission command information or the non-permission command information to the first management server 102 when the first issuing part 122 issues the permission command information or the non-permission command information.

When the third communication part 113 of the first management server 102 receives the permission command information or the non-permission command information, the second processing part 112 performs the processing in accordance with the permission command information or the non-permission command information. When the first management server 102 receives the permission command information, the second processing part 112 determines that the working machine requested by the customer can be rented, and then notifies the communication device 105 of the information indicating that the rental reservation is completed. In addition, the second processing part 112 and the fourth storing part 111 carry out processing for updating the information stored in the fourth storing part 111. The second processing part 112 transmits, to the fourth storing part 111, the management number, the first specifying information of the working machine to which the rental permission is issued (the rental working machine), the permitting information (the permission command information), the rental customer information, the rental period, and the like. The fourth storing part 111 stores the management number, the first specifying information, the permitting information (the permission command information), the rental customer information, the rental period, and the like.

On the other hand, when the first management server 102 receives the non-permission command information, the second processing part 112 continues the processing on the assumption that the rental permission has not been issued to the working machine of the first specifying information corresponding to the non-permission command information. For example, the second processing part 112 extracts a working machine that can be rented during the rental period, determines the extracted working machine as an alternative for the working machine that has not been permitted to be rented, then transmits the first specifying information of the alternative working machine to the second management server 103, thereby requesting a rental permission of the alternative working machine. The second management server 103 executes processing as to whether or not to certify the alternative working machine as a rental working machine in the same manner as described above. When the rental permission is given to the alternative working machine (receiving the permission command information corresponding to the alternative working machine), the second processing part 112 transmits, to the communication device 105, information indicating that the alternative working machine can be rented instead of the working machine requested by the rental customer. When the first management server 102 receives the information indicating that the alternative working machine can be accepted, the second processing part 112 notifies the communication device 105 of the information indicating that the rental reservation has been completed.

Then, the second processing part 112 transmits, to the fourth storing part 111, the management number, the management number, the first specifying information of the alternative working machine (the rental working machine) to which the rental permission has been given, the permitting information (the permission command information), the rental customer information, the rental period, and the like. The fourth storing part 111 stores the management number, the first specifying information, the permitting information (the permission command information), the rental customer information, the rental period, and the like.

Next, a processing after the determination of the rental working machine will be explained. The processing after the determination of the rental working machine is not limited to the following embodiment.

Figure 12:
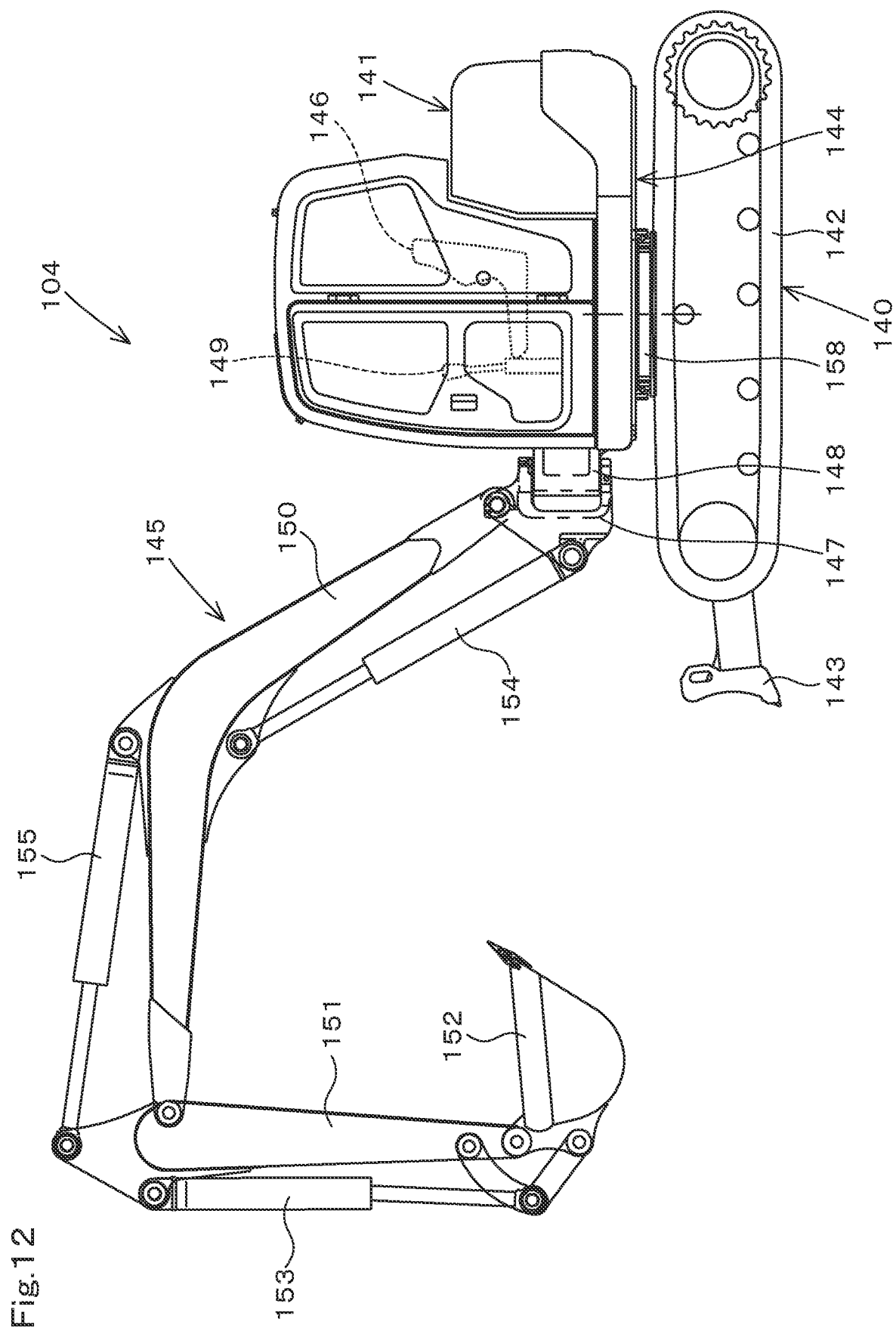
FIG. 12 is a side view illustrating a backhoe.

The working machine 104 will be described in detail at first,

FIG. 12 shows a backhoe that is an example of the working machine 104.

As shown in FIG. 12, the backhoe 104 includes a lower travel device 140 and an upper machine body 141.

The traveling device 140 has a traveling body 142 having a rubber covering band. A crawler type traveling device in which the traveling body 142 is driven by a traveling motor is employed. In addition, a dozer 143 is provided on a front portion of the traveling device 140.

The machine body 141 includes a swivel base 144 and a working device (an excavating device) 145. The swivel base 144 is supported on the traveling device 140 by a bearing 158 so as to be rotatable about a pivot axis of the bearing 158. The working device 145 is provided on the front portion of the swivel base 144. On the swivel base 144, an engine, a radiator, an operator seat 146, a fuel tank, a hydraulic fluid tank, and the like are provided.

The working device 145 includes a swing bracket 147, a boom 150, an arm 151, and a bucket 152. The swing bracket 147 is supported by the supporting body 148 so as to be swingable about a vertical axis. The swing bracket 147 is swung by the stretching and shortening of a swing cylinder provided in the swivel base 144. The boom 150 is supported by the swing bracket 147 so as to be swung around a lateral axis. The boom 150 is swung by the stretching and shortening of the boom cylinder 154 interposed between the boom 150 and the swing bracket 147. The arm 151 is supported by a tip end of the boom 150 so as to be swung about the lateral axis. The arm 151 is swung by the stretching and shortening of the arm cylinder 155 interposed between the arm 151 and the boom 150. The bucket 152 is provided at a tip end of the arm 151 so as to perform a shoveling operation and a dumping operation. The bucket 152 performs the a shoveling operation and the dumping operation by the stretching and shortening of a bucket cylinder 153 interposed between the bucket 152 and the arm 151.

As shown in FIG. 6, the backhoe is provided with a control device (a first control device) 160 configured to perform various controls relating to driving (that is, an operation) of the working machine. The control device 160 performs the various controls such as an auto idle control (an AI control), a flow rate control, and the like. The control in the working machine such as the backhoe is not limited to the configurations described below.

Various types of control signals are inputted to the control device 160, the various types of control signals including, for example, a governor angle (a governor position) from an governor sensor, an operation amount (an angle) of the accelerator lever, an ON signal/an OFF signal of the idle switch (AI-SW), an engine revolution speed from the engine revolution sensor, and an operation amount of an operation member (for example, an operation lever 149 and an operation switch shown in FIG. 12) for operating various types of actuators such as a swing cylinder, a boom cylinder 154, an arm cylinder 155, a bucket cylinder 153, and the like.

Under the AI control, when an operating member for operating the arm 151 (the arm cylinder 155), the boom 150 (the boom cylinder 154), or the like is operated, the engine revolution speed is increased or decreased in accordance with the operation amount of the accelerator lever, and when the operation member is not operated, the engine revolution speed is held at an idling state.

Specifically, under the AI control by the control device 160, when the operation lever 149 is set to the neutral position and the ON signal of the idle switch is input to the control device 160, the control device 160 outputs an idle signal to the auto idle motor to drive the auto idle motor regardless of the operation amount of the accelerator lever, and thereby the control device 160 sets the engine revolution speed to the idle speed. Additionally, under the AI control by the control device 160, when the operation lever 149 is swung back and forth or right and left to input an OFF signal of the idle switch to the control device 160, the control device 160 outputs an operation signal to the auto idle motor on the basis of the signal of the accelerator position, and thereby drives an auto idle motor. When the auto idle motor is driven, the governor lever is operated and thus the engine revolution speed reaches the revolution speed corresponding to the accelerator lever.

The flow rate control is to operate the actuator in accordance with the operation amount of the operation member.

Under the flow control by the control device 160, when the operation lever 149, for example, is swung from the neutral position, the control lever 160 outputs an electric current (an operation signal) of a predetermined value corresponding to the operation amount of the operation lever 149 to a solenoid that is constituted of an electromagnetic proportional valve disposed on the working machine. Then, the solenoid proportional valve opens in accordance with the electric current value (the operation amount), a pilot pressure of the control valve corresponding to the actuator is controlled, and thereby the actuator is operated.

The control device 160 has a sixth storing part 161 (a sixth memory 161) and a fifth communication part 164. The sixth storing part 161 is constituted of a nonvolatile memory and the like, and stores the specifying information (the third specifying information) of the working machine and the judgment information corresponding to the third specifying information. As will be described later, the judgment information is used for judgment in the control executed by the control device 160, and is the information same as the permission command information issued by the first issuing part 122, for example. Meanwhile, the third specifying information and the judgment information are written into the sixth storing part 161 at the time of manufacturing the working machine 104, at the time of selling the working machine 104, or the like.

The fifth communication part 164 is configured to communicate with various kinds of information. The fifth communication part 164 is constituted of a device configured to perform the wireless communication such as the WiFi®, the Bluetooth®, the ZigBee®, or the like. Note that the fifth communication part 164 may be constituted of a communication device (also referred to as a communicator) configured to be connected to the mobile phone communication network.

As shown in FIG. 6, the operation system of the working machine includes a control device (a first control device) 160, a command device (a first command device) 130, and a writing device (a first writing device) 131. The command device 130 is constituted of a device configured to store the command information and to count time (a clock time). That is, the command device 130 has a computing unit (a processing part) such as a CPU configured to count at least the time and perform predetermined processing, and is constituted of, for example, a tag, an IC card, or the like having a CPU. It should be noted that the command device 130 is constituted of a device other than an RFID or the like not having the computing unit such as a CPU. In addition, the command device 130 is constituted of a device configured to communicate with the fifth communication part 164.

The writing device 131 is configured to be connected to the first management server 102 or the second management server 103 through the network, and is configured to obtain the rental information including the permission command information through the network, for example. When the writing device 131 obtains the rental information of a predetermined working machine (the rental working machine) from the first management server 102 and is connected to the command device 130, the writing device 131 writes the rental information to the command device 130.

For example, when the writing device 131 obtains the rental information of the rental working machine having the first specifying information "K-RX 253200", the writing device 131 writes the "K-RX 253200" indicating the first specifying information, the rental period (9/1 to 9/25), and the "015501-389761" indicating the permission command information to the command device 130.

The command device 130 includes a first obtaining part 132, a first time calculating part (a first time counting part) 133, a sixth communication part 134, and a processing part (a third processing part) 135. The first obtaining part 132, the first time calculating part (the first time counting part) 133, the sixth communication part 134, and the third processing part 135 of the command device 130 are each constituted of the electric/electronic parts, the computer programs, and the like incorporated into the command device 130. The third processing part 135 is constituted of a CPU and the like.

The first obtaining part 132 obtains the rental information including a rental period (an expiration date), and obtains the rental information due to the writing by the writing device 131. For example, when the writing device 131 writes, to the command device 130, the first specifying information indicating the "K-RX 253200", the rental period indicating "9/1 to 9/25", and the permission command information (the permitting information), the first obtaining part 132 obtains the "K-RX 253200", the "9/1 to 9/25", the permission command information, and the like.

Note that instead of obtaining the rental information through the writing device 131, the first obtaining part 132 may obtain the rental information transmitted from the third communication part 113 of the first management server 102 through the sixth communication part 134. The first time calculating part 133 is constituted of a timer for obtaining the current time.

The sixth communication part 134 is configured to communicate with various types of information. The sixth communication part 134 is constituted of a device configured to perform, for example, the short range wireless communication or the short distance wireless communication such as the WiFi®, the Bluetooth®, the ZigBee®, and the like.

When the sixth communication part 134 of the command device 130 and the fifth communication part 164 of the control device 160 enter the communicable range (within the communication area), the command device 130 requests the third specifying information and the judgment information to the control device 160, Thereafter, the command device 130 obtains the third specifying information transmitted from the control device 160. Then, the third processing part 135 checks the third specifying information and the first specifying information with each other, and when the third specifying information and the first specifying information are matched with each other, the third processing part 135 checks the judgment information and the permission command information with each other. When the checking between the judgment information and the permission command information is successful (the judgment information and the permission command information are matched with each other), the third processing part 135 judges whether or not the current time (the clock time) is within the rental period. That is, it is judged whether or not the current time has reached the expiration date.

When the specifying information is matched (the checking is successful) and the permitting information is matched (the checking of the permitting information is successful) for example, the third processing part 135 refers to the current time (the clock time) obtained by the first time calculating part 133 and judges whether or not the current time is within the rental period. That is, the third processing part 135 judges whether or not the current time has reached the expiration date on the basis of the time obtained by the first time calculating part 133.

The expiration date is the last day of the rental period and not exceeding the last day within the rental period; for example, if the rental period is 9/1 to 9/25, "23:59:59 on 9/25" is the expiration date.

When the current time does not reach the expiration date, the third processing part 135 determines that the control by the control device 160 is not restricted. When the third processing part 135 determines not to restrict the control, the sixth communication part 134 outputs, to the control device 160, a permission command (a second command) that orders not to restrict the control. When obtaining the permission command (the second command) transmitted from the command device 130 (the sixth communication part 134), the control device 160 performs the control as usual without restricting the control of the traveling system and the working system.

On the other hand, when the current time (the clock time) calculated by the first time calculating part 133 exceeds the rental period, that is, when the current time reaches the expiration date, the third processing part 135 determines to carry out the control by the control device 160. When the third processing part 135 determines to carry out the control by the control device 160, the sixth communication part 134 outputs, to the control device 160, a restriction command (a first command) that orders the restriction of the control. Wien obtaining the restriction command (the first command) transmitted from the command device 130 (the sixth communication part 134), the control device 160 restricts the control of the traveling system and the working system. The control device 160 restricts the normal control of the working machine 104 by, for example, not performing the AI control and the flow rate control. That is, when restriction of the control by the control device 160 is carried out, the working machine 104 cannot perform the normal control, and thus the operation of the working machine 104 can be stopped.

In the embodiment described above, the working machine 104 can not be moved when the rental period expires (out of the expiration date), and in addition to that, the rental period may be extended. A modified example of extension of the rental period will be described below.

When the working machine requested by the rental customer can be rented even after the rental period has elapsed (in the case where it can be assumed that the working machine can be continuously rented even after the rental period), the second processing part 112 of the management server 2 preliminarily determines an extended period that continues to the rental period within a range where the rental is possible. For example, in the case where the rental period is from 9/1 to 9/25, the second processing part 112 sets the extended period to 9/26-10/5 if the working machine can be rented for further 10 days.

The second processing part 112 issues the extended period associated with the permitting information (the permission command information). Other than the rental period, the fourth storing part 111 stores an extended period associated with the permitting information. In addition, the extended period associated with the permitting information is transmitted from the first management server 102 to the command device 130 (the writing device 131) at the same time when the command device 130 (the writing device 131) obtains the rental information, that is, when the command device 130 obtains the permission command information.

The first obtaining part 132 of the command device 130 is configured to obtain the extended period associated with the permitting information. When the writing device 131 writes the extended period associated with the permitting information to the command device 130, the first obtaining part 132 obtains the written extended period. The command device 130 is provided with a switch. The third processing part 135 of the command device 130 permits using the extended period when the switch is pushed under a state where the permitting information is matched with the judgment information and where the extended period associated with the permitting information is held in the command device 130. That is, the third processing part 135 extends the expiration date to the last day of the extended period.

Note that the second processing part 112 may issue a code (a permitting code) different from the permitting information in addition to the extended period. In that case, the fourth storing part 111 stores the extended period and the permitting code in addition to the rental period. Further, the extended period and the permitting code are transmitted from the first management server 102 to the command device 130 (the writing device 131) at the same time when the command device 130 (the writing device 131) obtains the rental information, that is, when the command device 130 obtains the permission command information.

The first obtaining part 132 of the command device 130 is configured to obtain the extended period and the permitting code. When the writing device 131 writes the extended period and the permitting code to the command device 130, the first obtaining part 132 obtains the written extended period and the written permitting code. On the other hand, a code (an external code) can be inputted to a display device or the like mounted on the working machine 104. When the switch or the like disposed on the command device 130 is turned on, the third processing part 135 of the command device 130 requests the external code to the control device 160. On the other hand, when an external code is inputted to the display device or the like after the request of the extremal code from the command device 130, the control device 160 transmits the external code to the command device 130. When the external code transmitted from the control device 160 and the permitting code are matched with each other, the third processing part 135 of the command device 130 permits use of the extended period. That is, the third processing part 135 extends the expiration date to the last day of the extended period.

In this manner, the extended period is written in the command device 130 after the starting of the rental of the working machine 104, and thus the expiration date can be easily extended in offline without the connection between the command device 130 and the first management server 102 at any time when the extension is requested.

Meanwhile, the writing device 131 writes the permission command information (the permitting information) indicated by the numeric numerals or the like to the command device 130; however, instead of writing "015501-389761" indicated by the numeric numbers or the like to the command device 130, a flag indicating that rental is permitted to the rental working machine whose first specifying information is "K-RX 253200" during a rental period (9/1 to 9/25) (the information indicating that the control can be carried out as usual without the restriction) may be written to the command device 130. In that case, in the case where the current time has not reached the expiration date and when the permitting information is obtained, the command device 130 determines that the control by the control device 160 is not restricted. On the other hand, even in the case where the current time has not reached the expiration date, the command device 130 restricts the control by the control device 160 when the permitting information could not be obtained.

As described above, the first management server 102 owned by the rental company and the second management server 103 owned by the manufacturer are linked with each other, and thereby the rental company simply manages the working machine 104. For example, the maker performs the permission for the rental and the permission command information (the permitting information) for driving the working machine 104 is issued from the manufacturer side, and thus the rental company can save costs for managing the key (the permitting information) used for driving lots of the owning working machines 104. That is, the maker utilizes the information (the working machine information) managed by the maker at the time of manufacturing or selling, and thereby it is possible to easily generate a key for operating the rental working machine and to provide the key to the rental company.

In addition, since the first management server 102 owned by the rental company and the second management server 103 owned by the manufacturer are linked with each other, information sharing between the rental company and the manufacturer can be established, and thus the rental of the working machine 104 can be smoothly carried out.

In addition, since the command device 130 counts the clock time and has the authority to control what kind of the control is carried out in the control device 160, the command device 130 is capable of stopping the working machine 104 without the judgement by the control device 160 of the working machine 104 under the state where the rental period has elapsed. That is, the control device 160 may be provided with a part configured to count the time and a judging part configured to judge whether or not the expiration date has come.

Fourth Embodiment

Figure 9:
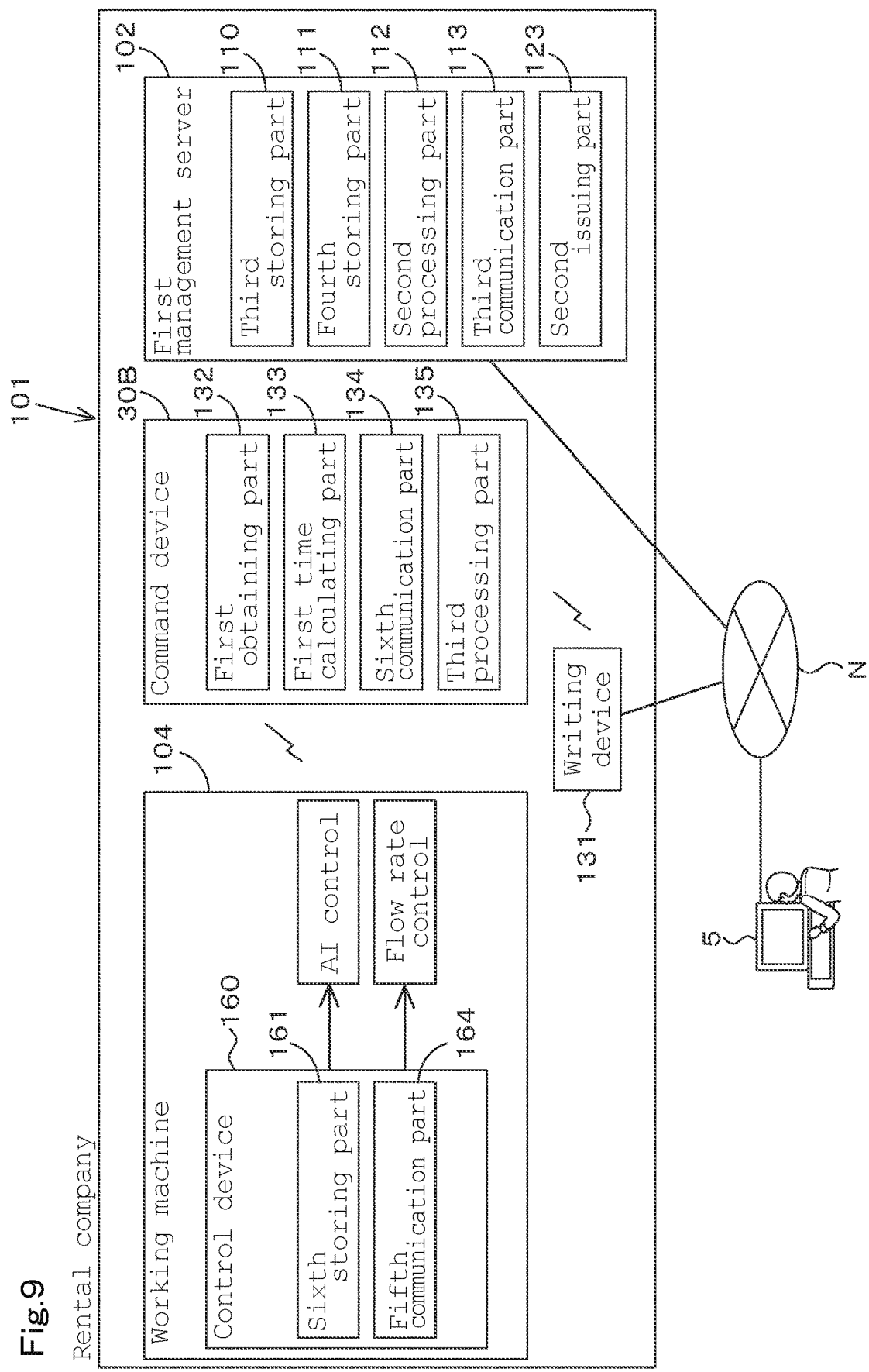
FIG. 9 is a schematic view illustrating a rental system according to a fourth embodiment.

FIG. 9 shows a rental system of a working machine according to the fourth embodiment.

The rental system of the working machine shown in FIG. 9 is a system in which the second management server 103 is omitted and the first management server 102 is configured to issue the permission command information (the permitting information). Descriptions of the configurations similar to those of the above-described embodiment will be omitted.

The first management server 102 includes a second issuing part 123. The second issuing part 123 is constituted of electric/electronic parts, computer programs, and the like incorporated in the first management server 102. After the second processing part 112 judges that the requested working machine can be rented, the second issuing part 123 determines and approves the working machine allowed to be rented as the rental working machine to which the rental permission is given, and issues the command information (the permission command information) indicating the determination. After the issue of the permission command information, the second processing part 112 notifies the communication device 105 of the information indicating that the rental reservation has been completed, assuming that the working machine requested by the rental customer can be rented. In addition, the second processing part 112 and the fourth storing part 111 perform a processing for updating information stored in the fourth storing part 111. The second processing part 112 transmits the management number, the management number, the first specifying information of the working machine (the rental working machine) to which the rental permission is given, the permitting information (the permission command information), the rental customer information, the rental period, and the like to the fourth storing part 111. The fourth storing part 111 stores the management number, the first specifying information, the permitting information (the permission command information), the rental customer information, the rental period, and the like.

In the case of renting the working machine, the writing device 131 is connected to the first management server 102 through the network, and obtains the rental information including the permission command information through the network. Then, when the command device 130 is connected to the writing device 131, the rental information such as the first specifying information of the rental working machine, the rental period, and the permission command information is written to the command device 130. The command device 130 according to the fourth embodiment has the configuration similar to the configuration of the embodiment mentioned above.

In this manner, since the command device 130 counts the clock time and has the authority to control what kind of the control is carried out in the control device 160, the command device 130 is capable of stopping the working machine 104 without the judgement by the control device 160 of the working machine 104 under the state where the rental period has elapsed.

In the embodiment described above, the permission command information corresponding to the specifying information of the working machine is issued on the second management server 103 side, while the control device 160 preliminarily stores the judgment information corresponding to the specifying information of the working machine, and thereby the permission command information and the judgment information are matched with each other in the working machine having the identical specifying information, so that the control device 160 can carry out the normal control without the restriction. Instead of that, it is also possible to allow the control device 160 to carry out the normal control without the restriction under the state where the control device 160 does not store the judgment information.

In that case, the first specifying information is encrypted using the permission command information issued by the first issuing part 122 of the second management server 103. Then, the second management server 103 transmits, to the first management server 102, the first specifying information that has been encrypted, the first specifying information that has not been encrypted, and the permission command information. The writing device 131 writes the first specifying information that is encrypted, the permission command information, and the rental period into the command device 130. In the command device 130, the third processing part 135 decrypts the encrypted first specifying information with use of the encrypted first specifying information and the permission command information, and judges whether or not the third specifying information is matched with the first specifying information that has been decrypted. Also in that case, it can be judged whether or not the permission command information is valid without writing the judgment information to the control device 160.

In the embodiment mentioned above, the AI control and the flow rate control are not carried out as the restriction of the control; however, it is obvious that the control device 160 is not limited to that configuration, and for example, it is possible to hold the engine revolution speed at a low speed, to stop the engine starting itself (to prohibit the engine starting), or to provide the restriction to various controls, thereby preventing the working machine 104 from being operated as usual.

In the embodiment mentioned above the rental information including the permission command information (the permission signal) transmitted from the first management server 102 is written to the command device 130; however, it is not necessarily required for the rental information to be obtained from the first management server 102. For example, the command device 130 may be connected to a personal computer or the like, information corresponding to the rental information may be created by the personal computer, and then the created rental information may be written to the command device 130.

Fifth Embodiment

The management system of the working machine includes a rental system of the working machine. The rental system of the working machine will be explained. Meanwhile, for convenience of the explanation, descriptions common to those of the embodiments mentioned above in the rental system of the working machine may be omitted.

Figure 10:
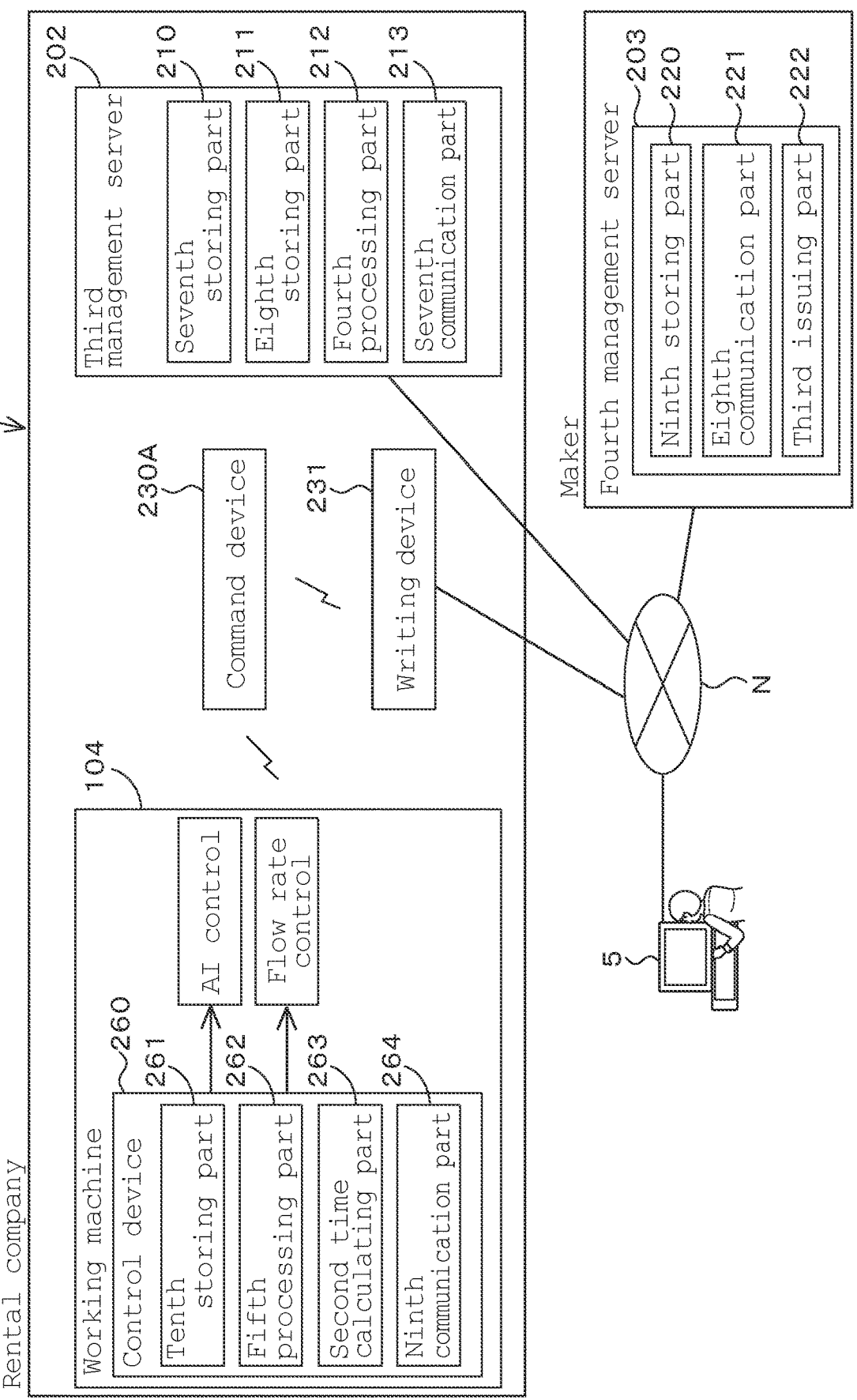
FIG. 10 is a schematic view illustrating a rental system of a working machine according to a fifth embodiment.

FIG. 10 is a schematic diagram of the rental system of the working machine according to a fifth embodiment.

As shown in FIG. 10, the rental system 1 of the working machine includes a third management server 202 and a fourth management server 203.

The third management server 202 includes a seventh storing part (a first working machine information storing part) 210 (a seventh memory 210), an eighth storing part (a rental information storing part) 211 (an eighth memory 211), a processing part (a fourth processing part) 212, and a seventh communication part 213. The seventh storing part 210 and the eighth storing part 211 are each constituted of a nonvolatile memory or the like. The fourth processing part 212 and the seventh communication part 213 are each constituted of electric/electronic parts, computer programs, and the like incorporated in the third management server 202.

The seventh storing part 210 stores information (the working machine information) on the working machine owned by the rental company. For example, as shown in FIG. 7A, the seventh storing part 210 stores the management number of the working machine, the specifying information of the working machine, the model of the working machine, and the like. The management number of the working machine is the number that the rental company has given for management of the rental. The specifying information of the working machine is information specifying the working machine and is unique information (for example, a manufacturing number, a serial number, and the like) assigned to the working machine. The model of the working machine is a name and the like uniquely determined by the manufacturer depending on the specifications of the working machine, the size of the working machine, and the like.

The eighth storing part 211 stores the information (referred to as the rental information) on the rental of the working machine. For example, as shown in FIG. 7B, the eighth storing part 211 stores, as the rental information, the management number of the working machine already rented, the specifying information of the working machine, the permitting information, the rental customer information, the rental period, and the like. The permitting information is a number (the permission command information) or the like indicating permission for the rental notified from the fourth management server 203 at the time of the rental.

The seventh communication part 213 is constituted of a device configured to transmit and receive various information with the fourth management server 203, the communication device 205 (also referred to as the communicator 205), and the like. The seventh communication part 213 transmit and receive predetermined information in accordance with the processing of the third management server 202, the fourth management server 203, and the communication device 205.

The fourth processing part 212 is a part configured to perform various processing related to the rental. For example, when the communication device 205 is connected to the third management server 202 and when a request for the rental (a request for the input screen) is issued to the third management server 202, the fourth processing part 212 executes a processing to display the input screen on the communication device 205. In addition, when the rental customer information, the customer request information, and the like are inputted to the input screen, the fourth processing part 212 executes a processing to judge whether or not the requested working machine can be rented out during the requested rental period on the basis of the customer request information. Specifically, the fourth processing part 212 refers to the models of the working machine stored in the seventh memory unit 210, and calculates how many the working machines of the model requested for the rental are owned. That is, the fourth processing part 212 calculates the number of the working machines of the model owned by the rental company in the model requested for the rental. Note that the working machines may be sorted in advance for each model, and thereby the number of owned machines may be stored in the seventh storing part 210.

Then, referring to the eighth storing part 211, the fourth processing part 212 calculates the number of the working machines that are already rented (the number of rented units) during the rental period, and then calculates the number of the working machines ready to be rented (referred to as the ready-for-rental number) on the basis of the number of rented units and the number of owned units. In the case where the ready-for-rental number is equal to or more than the requested number, the fourth processing part 212 determines that the requested working machine can be rented to the rental customer.

For example, when the ready-for-rental number is three and the requested number is five, it is possible to rent at least the three working machines corresponding to the ready-for-rental number. In that case, the fourth processing part 212 notifies the communication device 105 of the ready-for-rental number, requests the communication device 205 to change the requested number, and the fourth processing part 212 determines that the rental can be carried out if the requested number after the change is equal to or less than ready-for-rental number.

The fourth processing part 212 carries out a processing to transmit the first information to the fourth management server 203 from the seventh communication part 213 when the fourth processing part 212 determines that it is possible to rent a requested working machine, that is, when a rental reservation for a predetermined working machine is made. The first information is information on a predetermined working machine, that is, a working machine that can be rented, and is information managed by the third management server 202. The first information is the management number of the working machine, the specifying information that specifies the working machine, the model of the working machine, and the like.

In the embodiment, when the rental reservation is made for the working machine, the fourth processing part 212 refers to the seventh storing part 210 and the eighth storing part 211 and extracts the specifying information (referred to as first specifying information) of the working machine same as the requested working machine. The seventh communication part 213 transmits, to the fourth management server 203, the rental permission request and the first information including the first specifying information extracted by the fourth processing part 212.

Now; the fourth management server 203 has a ninth storing part (the second working machine information storing part) 220 (a ninth memory 220), an eighth communication part 221, and a third issuing part 222. The ninth storing part 220 is constituted of a nonvolatile memory or the like. The eighth communication part 221 and the third issuing part 222 are each constituted of electric/electronic parts, computer programs, and the like incorporated in the fourth management server 203.

The ninth storing part 220 stores the information on the manufactured working machine or the information on the sold working machine. The information on the manufactured working machine or the information on the sold working machine are referred to as the second information. For example, the ninth storing part 220 stores, as the second information, the specifying information of the working machine, a model of the working machine, and the like as shown in FIG. 8A.

The eighth communication part 221 is a device configured to transmit and receive various information to and from the third management server 202 and the like. The eighth communication part 221 receives and transmits the predetermined information in accordance with the processing of the third management server 202, the fourth management server 203, and the like.

The third issuing part 222 refers to the first information transmitted from the third management server 202 and the second information stored in the ninth storing part 220 at first, and determines a working machine to which a rental permission is given (referred to as the rental working machine). Specifically, when the fourth management server 203 receives the rental permission request and the first information including the first specifying information, the third issuing part 222 starts the determining process in response to the rental permission request. The third issuing part 222 judges whether or not the second specifying information corresponding to the first specifying information received by the fourth management server 203 is stored in the ninth storing part 220.

For example, as shown in FIG. 8B, when the first specifying information is "K-RX 253200", the third issuing part 222 refers to the ninth storing part 220 and judges whether the second specifying information indicated by the "K-RX 253200" is stored in the ninth storing part 220. In that case, the "K-RX 253200" is stored as the second specifying information in the ninth storing part 220, and thus the third issuing part 222 determines that the second specifying information corresponding to the first specifying information is stored (the presence of the working machine).

In the case of the presence of the working machine, the third issuing part 222 determines, as the rental working machine permitted for the rental, a working machine corresponding to the first specifying information ("K-RX 253200") that is matched with the second specifying information ("K-RX 253200"), and issues the command information indicating that the working machine has been determined (referred to as the permission command information). The permission command information is information indicating that the working machine of the first specifying information is determined as the rental working machine (the information indicating the rental permission), and is indicated by numerals of several digits or the like. In addition, the permission command information is associated with the working machine in advance, and the second specifying information ("K-RX 253200") and the permission command information are associated with each other in advance. That is, the third issuing part 222 issues the permission command information preliminarily associated with the second specifying information.

Thus, the third issuing part 222 issues the associated permission command information in response to the first specifying information notified from the third management server 202, and thereby the third issuing part 222 issues the rental permission to the working machine of the first specifying information.

In the above description, the third issuing part 222 provides a flag or the like indicating the rental permission on the first specifying information notified from the third management server 202 to set the permission command information (the permitting information), and thereby the rental permission may be given to the working machine of the first specifying information.

On the other hand, when the first specifying information is "K-253800", the "K-253800" is not stored in the ninth storing part 220 as the second specifying information, and thus the third issuing part 222 determines that the second specifying information that is matched with the first specifying information is not stored (the working machine is not there).

When the working machine is not there, the third issuing part 222 regards the working machine corresponding to the first specifying information (the "K-253800") as a working machine that cannot be rented, and issues the non-permission command information indicating that the rental is not permitted. In that case, the non-permission command information is information indicating that the working machine of the first specifying information is a working machine to which the rental permission cannot be given (information indicating non-permission for the rental).

The eighth communication part 221 of the fourth management server 203 transmits the permission command information or the non-permission command information to the third management server 202 when the third issuing part 222 issues the permission command information or the non-permission command information.

When the seventh communication part 213 of the third management server 202 receives the permission command information or the non-permission command information, the fourth processing part 212 performs the processing in accordance with the permission command information or the non-permission command information. When the third management server 202 receives the permission command information, the fourth processing part 212 determines that the working machine requested by the customer can be rented, and then notifies the communication device 205 of the information indicating that the rental reservation is completed. In addition, the fourth processing part 212 and the eighth storing part 211 carry out processing for updating the information stored in the eighth storing part 211. The fourth processing part 212 transmits, to the eighth storing part 211, the management number, the first specifying information of the working machine to which the rental permission is given (the rental working machine), the permitting information (the permission command information), the rental customer information, the rental period, and the like. The eighth storing part 211 stores the management number, the first specifying information, the permitting information (the permission command information), the rental customer information, the rental period, and the like.

On the other hand, when the third management server 202 receives the non-permission command information, the fourth processing part 212 continues the processing on the assumption that the rental permission has not been given to the working machine of the first specifying information corresponding to the non-permission command information. For example, the fourth processing part 212 extracts a working machine that can be rented during the rental period, determines the extracted working machine as an alternative for the working machine that has not been permitted to be rented, then transmits the first specifying information of the alternative working machine to the fourth management server 203, thereby requesting a rental permission of the alternative working machine. The fourth management server 203 executes processing as to whether or not to certify the alternative working machine as a rental working machine in the same manner as described above. When the rental permission is given to the alternative working machine (receiving the permission command information corresponding to the alterative working machine), the fourth processing part 212 transmits, to the communication device 205, information indicating that the alternative working machine can be rented instead of the working machine requested by the rental customer. When the third management server 202 receives the information indicating that the alternative working machine can be accepted, the fourth processing part 212 notifies the communication device 205 of the information indicating that the rental reservation has been completed.

Then, the fourth processing part 212 transmits, to the eighth storing part 211, the management number the management number, the first specifying information of the alternative working machine (the rental working machine) to which the rental permission has been given, the permitting information (the permission command information), the rental customer information, the rental period, and the like. The eighth storing part 211 stores the management number, the first specifying information, the permitting information (the permission command information), the rental customer information, the rental period, and the like.

Next, a processing after the determination of the rental working machine will be explained. The processing after the determination of the rental working machine is not limited to the following embodiment.

As shown in FIG. 10, the backhoe is provided with a control device (the second control device) 260 configured to perform various controls relating to driving (that is, an operation) of the working machine. The control device 260 performs the various controls such as an auto idle control (the AI control), a flow rate control, and the like. The control in the working machine such as the backhoe is not limited to the configurations described below.

Various types of control signals are inputted to the control device 160, the various types of control signals including, for example, a governor angle (a governor position) from an governor sensor, an operation amount (an angle) of the accelerator lever, an ON signal/an OFF signal of the idle switch (AI-SW), an engine revolution speed from the engine revolution sensor, and an operation amount of an operation member (for example, the operation lever 149 and an operation switch shown in FIG. 12) for operating various types of actuators such as a swing cylinder, the boom cylinder 154, the arm cylinder 155, the bucket cylinder 153, and the like.

Under the AI control, when an operating member for operating the arm 151 (the arm cylinder 155), the boom 150 (the boom cylinder 154), or the like is operated, the engine revolution speed is increased or decreased in accordance with the operation amount of the accelerator lever, and when the operation member is not operated, the engine revolution speed is held at an idling state.

Specifically, under the AI control by the control device 260, when the operation lever 149 is set to the neutral position and the ON signal of the idle switch is input to the control device 260, the control device 260 outputs an idle signal to the auto idle motor to drive the auto idle motor regardless of the operation amount of the accelerator lever, and thereby the control device 260 sets the engine revolution speed to the idle speed. Additionally, under the AI control by the control device 260, when the operation lever 149 is swung back and forth or right and left to input an OFF signal of the idle switch to the control device 260, the control device 260 outputs an operation signal to the auto idle motor on the basis of the signal of the accelerator position, and thereby drives an auto idle motor. When the auto idle motor is driven, the governor lever is operated and thus the engine revolution speed reaches the revolution speed corresponding to the accelerator lever.

The flow rate control is to operate the actuator in accordance with the operation amount of the operation member.

Under the flow control by the control device 260, when the operation lever 149, for example, is swung from the neutral position, the control lever 260 outputs an electric current (an operation signal) of a predetermined value corresponding to the operation amount of the operation lever 149. Then, the solenoid proportional valve opens in accordance with the electric current value (the operation amount), a pilot pressure of the control valve corresponding to the actuator is controlled, and thereby the actuator is operated.

The control device 260 has a tenth storing part 261 (a tenth memory 261), a processing part (a fifth processing part) 262, a second time calculating part (a second time counting part) 263, and a ninth communication part 264. The tenth storing part 261 is constituted of a nonvolatile memory and the like, and stores the specifying information (the third specifying information) of the working machine and the judgment information corresponding to the third specifying information. As will be described later, the judgment information is used for judgment in the control executed by the control device 260, and is the information same as the permission command information issued by the third issuing part 222, for example. Meanwhile, the third specifying information and the judgment information are written into the tenth storing part 261 at the time of manufacturing the working machine 104, at the time of selling the working machine 104, or the like.

The fifth processing part 262 and the second time calculating part 263 are each constituted of electric/electronic parts, computer programs, and the like incorporated in the control device 260. The fifth processing part 262 determines whether to limit control by the control device 260 based on the rental period or the like. The second time calculating part 263 is a timer for obtaining the current time.

The ninth communication part 264 is configured to communicate with various kinds of information. The ninth communication part 264 is constituted of a device such as an IC tag, an IC card and the like that are configured to perform the short range wireless communication or the wireless communication such as the WiFi®, the Bluetooth®, the ZigBee®, or the like. Note that the ninth communication part 264 may be constituted of a communication device (also referred to as a communicator) configured to be connected to the mobile phone communication network.

As shown in FIG. 10, the rental system 201 of the working machine includes a command device (a second command device) 230A and a writing device (a second writing device) 231. The command device 230A is constituted of a device configured to store the command information including at least the permission command information and to communicate with the ninth communication part 264, and is constituted of an IC tag, an IC card, or the like, that is for example, a non-contact RFID. The writing device 231 is constituted of a device (a writer) configured to write the command information including at least the permission command information to the command device 230A, and writes the information including the command information an IC tag or an IC card.

The writing device 231 is configured to be connected to the third management server 202 or the fourth management server 203 through the network, and is configured to obtain the rental information including the permission command information through the network, for example. When the writing device 231 obtains the rental information of a predetermined working machine (the rental working machine) from the third management server 202 and when the command device 230A comes close to the writing device 231, the writing device 231 writes the rental information to the command device 230A.

For example, when the writing device 231 obtains the rental information of the rental working machine having the first specifying information "K-RX 253200", the writing device 231 writes the "K-RX 253200" indicating the first specifying information, the rental period (9/1 to 9/25), and the "015501-389761" indicating the permission command information to the command device 230A.

The command device 230A is configured to communicate with the ninth communication part 264 of the control device 260. If the command device 230A and the ninth communication part 264 are within the communicable range, the command device 230A transmits the first specifying information, the permission command information, and the rental period to the ninth communication part 264 of the working machine 104. When the ninth communication part 264 receives the first specifying information, the permission command information, and the rental period transmitted from the command device 230A, the fifth processing part 262 of the control device 260 judges whether or not the third specifying information stored in the tenth storing part 261 of the control device 260 is matched with the first specifying information (performs authentication of the specifying information). In addition, the fifth processing part 262 of the control device 260 judges whether or not the judgment information associated with the third specifying information is matched with the permission command information transmitted from the command device 230A (performs authentication of the judgment information and the permission command information).

When the third specifying information and the first specifying information are matched with each other (the authentication is established) and when the judgment information and the permission command information are matched with each other (the authentication is established), the fifth processing part 262 judges whether the current time (the clock time) is within the rental period. In other words, it is judged whether or not the current time has reached the expiration date. The expiration date is the last day of the rental period which does not exceed the last day of the rental period, and, for example, if the rental period is 9/1 to 9/25, "23:59:59 on 9/25" is the expiration date.

When the current time does not reach the expiration date, the fifth processing part 262 determines that the control by the control device 260 is not restricted. When the fifth processing part 262 determines not to restrict the control by the control device 260, the control device 260 performs the control as usual without restricting the control of the traveling system and the working systems. On the other hand, when the current time exceeds the rental period, that is, when the current time reaches the expiration date, the fifth processing part 262 determines to carry out the restriction to the control by the control device 260. In the case where the control by the control device 260 is restricted, the fifth processing part 262 restricts the control. The fifth processing part 262 restricts the normal control of the working machine 104 by, for example, not performing the AI control and the flow rate control That is, when restriction of the control by the fifth processing part 262 is carried out, the working machine 104 cannot perform the normal control, and thus the operation of the working machine 104 can be stopped.

Meanwhile, the writing device 231 writes the permission command information (the permitting information) indicated by the numeric numerals or the like to the command device 230A; however, instead of writing the "015501-389761" indicated by the numeric numbers or the like to the command device 230A, a flag indicating that rental is permitted in the rental period "9/1 to 9/25" to the rental working machine whose first specifying information is "K-RX 253200" (the information indicating that the control can be carried out as usual without the restriction) may be written to the command device 230A. In that case, the command device 230A transmits the permitting information indicated by the flag or the like, the rental period, and the first specifying information to the control device 260. The fifth processing part 262 of the control device 260 does not restrict the control by the control device 260 when the current time has not reached the expiration date and when the fifth processing part 262 obtains the permitting information. On the other hand, even if the current time has not reached the expiration date, the fifth processing part 262 of the control device 260 restricts the control by the control device 260 when the permitting information could not be obtained.

As described above, the third management server 202 owned by the rental company and the fourth management server 203 owned by the manufacturer are linked with each other, and thereby the rental company simply manages the working machine 104. For example, the maker performs the permission for the rental and the permission command information (the permitting information) for driving the working machine 104 is issued from the manufacturer side, and thus the rental company can save costs for managing the key (the permitting information and the like) used for driving lots of the owning working machines 104. That is, the maker utilizes the information (the working machine information) managed by the maker at the time of manufacturing or selling, and thereby it is possible to easily generate a key for operating the rental working machine and to provide the key to the rental company. In addition, since the third management server 202 owned by the rental company and the fourth management server 203 owned by the manufacturer are linked with each other, information can be shared between the rental company and the manufacturer, and the rental of the working machine 104 can be performed smoothly.

Sixth Embodiment

Figure 11:
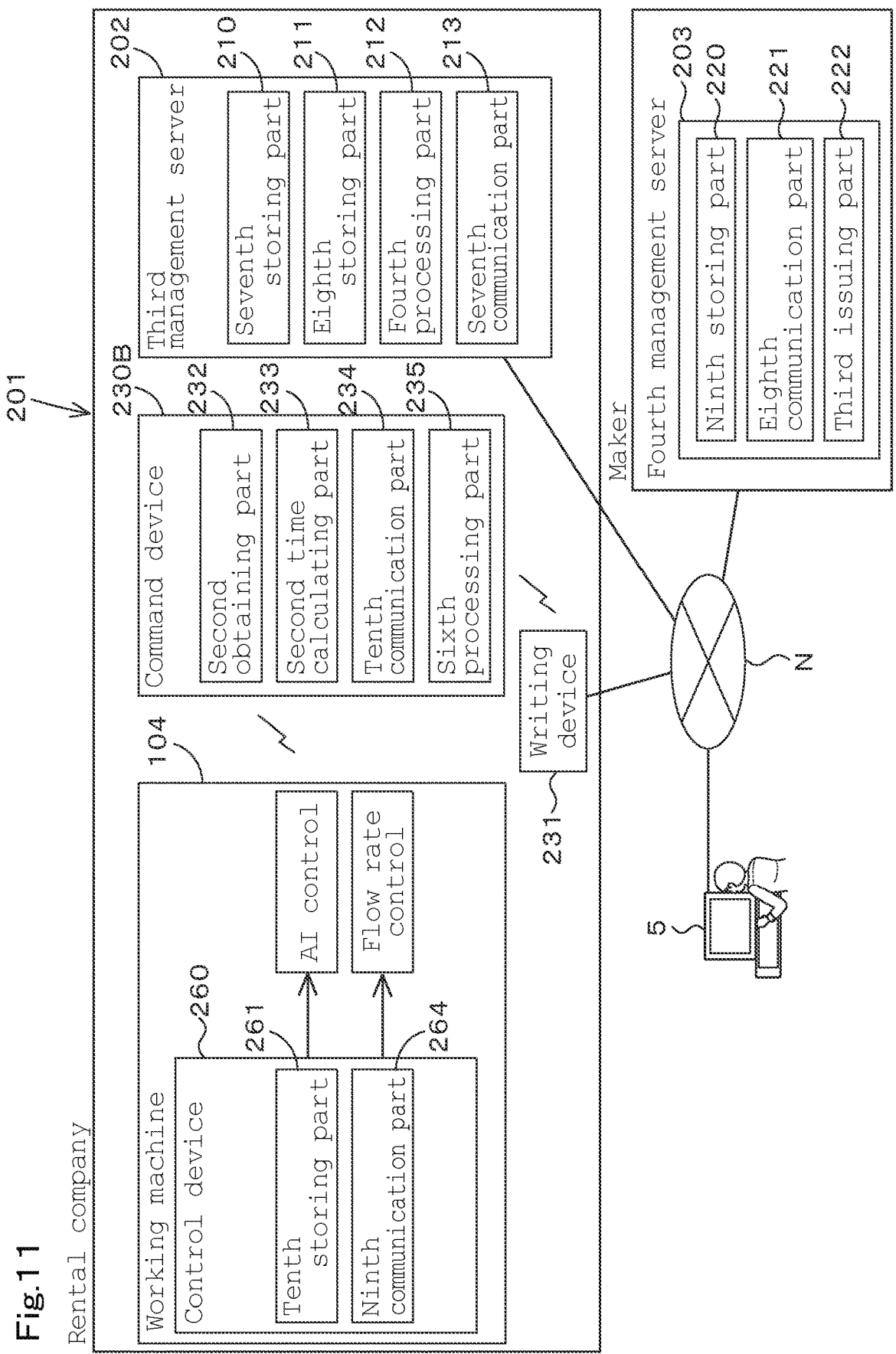
FIG. 11 is a schematic view illustrating a rental system of a working machine according to a sixth embodiment.

FIG. 11 shows a rental system of a working machine according to the sixth embodiment.

The rental system of the working machine according to the sixth embodiment is a system in which the command device side, not the control device 260, judges whether or not the control by the control device mounted on the working machine 104 is restricted. Descriptions of the configurations similar to the configurations of the above-described embodiments will be omitted.

The command device (a second command device) 230B is a device configured to store the command information and can count time (the clock time). That is, the command device 230B has a computing part (a processing part) such as a CPU configured to at least count time and perform predetermined processing, and is, for example, constituted of a tag having a CPU, an IC card having a CPU, or the like. Note that the command device 230B is a device different from an RFID or the like not having the computing part such as a CPU.

The command device 230B includes a second obtaining part 232, a second time calculating part (a second time counting part) 233, a tenth communication part 234, and a processing part (a sixth processing part) 235. The second obtaining part 232, the third time calculating part (the third time counting part) 233, the tenth communication part 234, and the sixth processing part 235 are each constituted of electric/electronic parts, computer programs, and the like incorporated in the command device 230B, and, for example, the sixth processing part 235 is constituted of a CPU or the like.

The second obtaining part 232 obtains the rental information including the rental period (the expiration date), and obtains the rental information due to the writing by the writing device 231. For example, when the writing device 231 writes, to the command device 230B, the first specifying information indicating the "K-RX 253200", the rental period indicating "9/1 to 9/25", and the permission command information (the permitting information), the second obtaining part 232 obtains the "K-RX 253200", the "9/1 to 9/25", the permission command information, and the like.

Note that instead of obtaining the rental information through the writing device 231, the second obtaining part 232 may obtain the rental information transmitted from the seventh communication part 213 of the third management server 202 through the tenth communication part 234. The third time calculating part 233 is constituted of a timer for obtaining the current time.

The tenth communication part 234 is configured to communicate with various types of information. The tenth communication part 234 is constituted of a device configured to perform, for example, the short range wireless communication or the short distance wireless communication such as the WiFi®, the Bluetooth®, the ZigBee®, and the like.

When the tenth communication part 234 of the command device 230B and the ninth communication part 264 of the control device 260 enter the communicable range (within the communication area), the command device 230B requests the third specifying information and the judgment information to the control device 260. Thereafter, the sixth processing part 235 checks the third specifying information and the first specifying information with each other, and when the third specifying information and the first 53' specifying information are matched with each other, the sixth processing part 235 checks the judgment information and the permission command information with each other. When the checking between the judgment information and the permission command information is successful (the judgment information and the permission command information are matched with each other), the sixth processing part 235 judges whether or not the current time (the clock time) is within the rental period. That is, it is judged whether or not the current time has reached the expiration date.

The sixth processing part 235 refers, for example, to the matching of the specifying information (authorization is established), to the matching of the permitting information (authorization of the permitting information is established), and to the current time (the clock time) obtained by the time calculating part 33, and judges whether or not the current time is within the rental period. That is, it is judges whether or not the current time has reached the expiration date on the basis of the time obtained by the time calculating part 33.

When the current time does not reach the expiration date, the sixth processing part 235 determines that the control by the control device 260 is not restricted. When the sixth processing part 235 determines that the control is not to be restricted, the tenth communication part 234 outputs, to the control device 260, a permission signal (a permission command) ordering not to restrict the control. When the control device 260 obtains the permission signal transmitted from the command device 230B (the tenth communication part 234), the control device 260 performs the control as usual without restricting the control of the traveling system and the working system.

On the other hand, when the current time (the clock time) obtained by the time calculating part 33 exceeds the rental period, that is, when the current time reaches the expiration date, the sixth processing part 235 determines to restrict the control by the control device 260. When the sixth processing part 235 determines that the control by the control device 260 is to be restricted, the tenth communication part 234 outputs, to the control device 260, a restriction signal (a restriction command) for restricting the control. When the control device 260 obtains the restriction signal transmitted from the command device 230B (the tenth communication part 234), the control device 260 restricts the control of the traveling system and the working system. The control device 260 limits, for example, the normal control of the working machine 104 without carrying out the AI control or the flow rate control That is, when the control by the control device 260 is restricted, the working machine 104 cannot carry out the normal control, and the operation of the working machine 104 can be stopped.

In the embodiments mentioned above, the working machine 104 can not be moved when the rental period expires (out of the expiration date), and in addition to that, the rental period may be extended A modified example of extension of the rental period will be described below.

When the working machine requested by the rental customer can be rented even after the rental period has elapsed (in the case where it can be assumed that the working machine can be continuously rented even after the rental period), the fourth processing part 212 of the management server 2 preliminarily determines an extended period that continues to the rental period within a range where the rental is possible. For example, in the case where the rental period is from 9/1 to 9/25, the second processing part 112 sets the extended period to 9/26-10/5 if the working machine can be rented for further 10 days.

The fourth processing part 212 issues the extended period associated with the permitting information (the permission command information). Other than the rental period, the eighth storing part 211 stores an extended period associated with the permitting information. In addition, the extended period associated with the permitting information is transmitted from the third management server 202 to the command device 230B (the writing device 231) at the same time when the command device 230B (the writing device 231) obtains the rental information, that is, when the command device 230B obtains the permission command information.

The second obtaining part 232 of the command device 230B is configured to obtain the extended period associated with the permitting information. When the writing device 231 writes the extended period associated with the permitting information to the command device 230B, the second obtaining part 232 obtains the written extended period. The command device 230B is provided with a switch. The sixth processing part 235 of the command device 230B permits using the extended period when the switch is pushed under a state where the permitting information is matched with the judgment information and where the extended period associated with the permitting information is held in the command device 230B. That is, the sixth processing part 235 extends the expiration date to the last day of the extended period.

Note that the fourth processing part 212 may issue a code (a permitting code) different from the permitting information in addition to the extended period. In that case, the eighth storing part 211 stores the extended period and the permitting code in addition to the rental period. Further, the extended period and the permitting code are transmitted from the third management server 202 to the command device 230B (the writing device 231) at the same time when the command device 230B (the writing device 131) obtains the rental information, that is, when the command device 230 obtains the permission command information.

The second obtaining part 232 of the command device 230B is configured to obtain the extended period and the permitting code. When the writing device 231 writes the extended period and the permitting code to the command device 230B, the second obtaining part 232 obtains the written extended period and the written permitting code. On the other hand, a code (an external code) can be inputted to a display device or the like mounted on the working machine 104. When the switch or the like disposed on the command device 230B is turned on, the sixth processing part 235 of the command device 230B requests the external code to the control device 260, On the other hand, when the external code is inputted to the display device or the like after the request of the external code from the command device 230B, the control device 260 transmits the external code to the command device 230B. When the external code transmitted from the control device 260 and the permitting code are matched with each other, the sixth processing part 235 of the command device 230B permits use of the extended period. That is, the sixth processing part 235 extends the expiration date to the last day of the extended period.

In this manner, the extended period is written in the command device 230B after the starting of the rental of the working machine 104, and thus the expiration date can be easily extended in offline without the connection between the command device 230B and the third management server 202 at any time when the extension is requested.

Meanwhile, the writing device 231 writes the permission command information (the permitting information) indicated by the numeric numerals or the like to the command device 230B; however, instead of writing "015501-389761" indicated by the numeric numbers or the like to the command device 230B, a flag indicating that rental is permitted to the rental working machine whose first specifying information is "K-RX 253200" (the information indicating that the control can be carried out as usual without the restriction) may be written to the command device 230B. In that case, in the case where the current time has not reached the expiration date and when the permitting information is obtained, the command device 230B determines that the control by the control device 260 is not restricted. On the other hand, even in the case where the current time has not reached the expiration date, the command device 230B restricts the control by the control device 260 when the permitting information could not be obtained.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

In the embodiments described above, the fourth management server 203 side issues the permission command information corresponding to the specifying information of the working machine, while the control device 260 previously stores the judgment information corresponding to the specifying information of the working machine, and in the working machine having the same specifying information, the permission command information and the judgment information are matched with each other so that the control device 260 can carry out the normal control without restriction. Alternatively, the control device 260 may carry out the normal control without restriction under the state where the judgment information is not stored in the control device 260.

In that case, the first specifying information is encrypted using the permission command information issued by the third issuing part 222 of the fourth management server 203. Then, the fourth management server 203 transmits, to the third management server 202, the first specifying information that has been encrypted, the first specifying information that has not been encrypted, and the permission command information. The writing device 231 writes the first specifying information that is encrypted, the permission command information, and the rental period into the command device (the command device 230B). In the case of the first embodiment (the command device 230B), the first specifying information that is encrypted, the permission command information, and the rental period are transmitted to the control device 260, The sixth processing part 235 of the control device 260 decrypts the encrypted first specifying information with use of the permission command information, and judges whether or not the third specifying information is matched with the first specifying information that has been decrypted. Also in that case, it can be judged whether or not the permission command information is valid without writing the judgment information to the control device 260.

In the case of the second embodiment (the command device 230B), the sixth processing part 235 decrypts the encrypted first specifying information with use of the encrypted first specifying information and the permission command information, and judges whether or not the third specifying information is matched with the first specifying information that has been decrypted. Also in that case, it can be judged whether or not the permission command information is valid without writing the judgment information to the control device 260.

In the embodiments described above, the AI control and the flow rate control are not performed as the control limitation in the control device 260; however, it is obvious that the control device 260 is not limited to that configuration, and for example, it is possible to hold the engine revolution speed at a low speed, to stop the engine starting itself (to prohibit the engine starting), or to provide the restriction to various controls, thereby preventing the working machine 104 from being operated as usual.

What is claimed is:

1. An operation system of a working machine, the operation system being mounted on the working machine and comprising:
    a controller to perform at least one of an auto idle control in which an engine revolution speed is controlled in accordance with an operation amount of an accelerator lever, and a flow rate control in which at least one of a boom cylinder, an arm cylinder, and a bucket cylinder mounted on the working machine is operated in accordance with an operation amount of an operation member; and
    a commander to output a command to the controller in wireless, the command relating to control of the controller,
    wherein the commander comprises:
        an obtainer to obtain an expiration date of the working machine from outside;
        a timer to count time;
        a processor to judge whether the time counted by the timer meets the expiration date; and
        a communicator to output a first command when the time meets the expiration date, the first command restricting the auto idle control and the flow rate control of the controller, and to output a second command when the time does not meet the expiration date, the second command allowing the controller to perform the auto idle control and the flow rate control without restriction.

2. The operation system according to claim 1,
wherein the controller includes
    a memory to store judgment information,
wherein the obtainer is configured to obtain:
    permitting information permitting the control of the controller without restriction; and
    judgment information stored in the memory of the controller,
and wherein the processor outputs the second command from the communicator when the permitting information is authorized based on the judgment information and when the time does not meet the expiration date.

3. The operation system according to claim 1,
wherein the obtainer is configured to obtain from the outside:
    an extended period for the expiration date; and
    a permitting code to activate the extended period,
and wherein the processor is configured to extend the expiration data based on the extended period when the permitting code obtained by the obtaining part is authorized based on an external code inputted from the outside.

4. The operation system according to claim 3,
wherein the working machine includes
    a display to accept input of the external code,
and wherein the processor is configured to request the external code to the control device, the external code being inputted to the display.

5. An operation system of a working machine, comprising:
    a customer terminal;
    a controller mounted on the working machine to perform at least one of an auto idle control in which an engine revolution speed is controlled in accordance with an operation amount of an accelerator lever, and a flow rate control in which at least one of a boom cylinder, an arm cylinder, and a bucket cylinder mounted on the working machine is operated in accordance with an operation amount of an operation member;
    a first management server configured to communicate with the customer terminal and to manage rental of the working machine;
    a second management server configured to communicate with the first management server and to manage manufacturing and/or selling the working machine; and
    a commander configured to communicate with the first management server and to output command to the controller, wherein
    the customer terminal is configured to send to the first management server, customer request information indicating a machine type of the working machine and a rental period requested for the rental of the working machine,
    the first management server is configured to inquire the second management server whether the rental of the working machine of the customer request information is available,
    the second management server is configured to
        determine whether the rental of the working machine of the customer request information is available,
        send permission command information indicating availability of the rental to the first management server when the rental of the working machine is available, and send non-permission command information indicating unavailability of the rental to the first management server when the rental of the working machine is unavailable, the commander is configured to, after the first management server receives the permission command information, obtain the rental period of the customer request information, and output the command to the controller to perform the auto idle control and the flow rate control before the rental period expires, and to restrict the auto idle control and the flow rate control after the rental period expires.

6. The operation system according to claim 5, wherein the first management server is configured to send to the customer terminal, completion information indicating that rental reservation has been completed, when receiving the permission command information from the second management server.

7. The operation system according to claim 5, wherein the first management server is configured to, when receiving the non-permission command information from the second management server, set alternative request information indicating the machine type of an alternative working machine and the rental period, and inquire the second management server whether the rental of the alternative working machine of the alternative request information is available, the second management server is configured to determine whether the rental of the working machine of the alternative request information is available, send the permission command information indicating availability of the rental to the first management server when the rental of the alternative working machine is available, and send non-permission command information indicating unavailability of the rental to the first management server when the rental of the alternative working machine is unavailable, and the first management server is configured to send the alternative request information to the customer terminal.

8. The operation system according to claim 5, wherein the commander includes a tag or IC card having a CPU, which is configured to wirelessly output the command to the controller when the commander is located within a predetermined communication area.

9. The operation system according to claim 5, wherein the commander is configured to communicate with the first management server through a writer which receives the permission command information from the first management server.

10. The operation system according to claim 5, wherein the first management server is configured to preset an extended period that continues to the rental period, and the commander is configured to obtain and memorize the extended period from the first management server, output the command to the controller to perform the auto idle control and the flow rate control before the rental period expires, and to restrict the auto idle control and the flow rate control after the rental period expires.

11. An operation system of a working machine, comprising:

a customer terminal;

a controller mounted on the working machine to perform at least one of an auto idle control in which an engine revolution speed is controlled in accordance with an operation amount of an accelerator lever, and a flow rate control in which at least one of a boom cylinder, an arm cylinder, and a bucket cylinder mounted on the working machine is operated in accordance with an operation amount of an operation member;

a management server configured to communicate with the customer terminal;

a commander configured to communicate with the management server and to output command to the controller, wherein the customer terminal is configured to send to the management server, customer request information indicating a machine type of the working machine and a rental period requested for the rental of the working machine, the management server is configured to determine whether the rental of the working machine of the customer request information is available, send permission command information indicating availability of the rental to the commander when the rental of the working machine is available, and send non-permission command information indicating unavailability of the rental to the commander when the rental of the working machine is unavailable, the commander is configured to, after receiving the permission command information from the management server, obtain the rental period of the customer request information, and output the command to the controller to perform the auto idle control and the flow rate control before the rental period expires, and to restrict the auto idle control and the flow rate control after the rental period expires.

12. The operation system according to claim 11, wherein the management server is configured to send to the customer terminal, the permission command information and completion information indicating that rental reservation has been completed.

13. The operation system according to claim 11, wherein the management server is configured to, when sending the non-permission command information from the second management server, set alternative request information indicating the machine type of an alternative working machine and the rental period, and determine whether the rental of the working machine of the alternative request information is available, and send the permission command information indicating availability of the rental to the customer terminal when the rental of the alternative working machine is available.

14. The operation system according to claim 11, wherein the commander includes a tag or IC card having a CPU, which is configured to wirelessly output the command to the controller when the commander is located within a predetermined communication area.

15. The operation system according to claim 11, wherein the commander is configured to communicate with the management server through a writer which receives the permission command information from the management server.

16. The operation system according to claim 11, wherein
the management server is configured to preset an extended period that continues to the rental period, and
the commander is configured to
  obtain and memorize the extended period from the management server, and
  output the command to the controller to perform the auto idle control and the flow rate control before the rental period expires, and to restrict the auto idle control and the flow rate control after the rental period expires.

* * * * *